United States Patent
Eskridge et al.

(10) Patent No.: US 11,082,450 B2
(45) Date of Patent: Aug. 3, 2021

(54) USER INTERFACE SUPPORTING AN INTEGRATED DECISION ENGINE FOR EVOLVING DEFENSES

(71) Applicants: Raytheon BBN Technologies Corp., Cambridge, MA (US); Florida Institute of Technology, Inc., Melbourne, FL (US)

(72) Inventors: Thomas C. Eskridge, Satellite Beach, FL (US); Marco M. Carvalho, Satellite Beach, FL (US); Brett Benyo, Ayer, MA (US); Michael Atighetchi, Framingham, MA (US); Fusun Yaman, Arlington, MA (US)

(73) Assignees: Raytheon BBN Technologies Corp., Cambridge, MA (US); Florida Institute of Technology, Inc., Melbourne, FL (US)

( * ) Notice: Subject to any disclaimer, the term of this patent is extended or adjusted under 35 U.S.C. 154(b) by 720 days.

(21) Appl. No.: 15/958,357

(22) Filed: Apr. 20, 2018

(65) Prior Publication Data
US 2018/0309794 A1    Oct. 25, 2018

Related U.S. Application Data

(60) Provisional application No. 62/488,225, filed on Apr. 21, 2017.

(51) Int. Cl.
*H04L 29/06* (2006.01)
*H04L 12/24* (2006.01)
(Continued)

(52) U.S. Cl.
CPC .......... *H04L 63/20* (2013.01); *G06F 16/2423* (2019.01); *G06N 3/126* (2013.01);
(Continued)

(58) Field of Classification Search
CPC ..... H04L 63/20; H04L 63/1433; H04L 41/08; H04L 41/22; H04L 63/14; H04L 63/1441; G06F 16/2423; G06N 3/126
See application file for complete search history.

(56) References Cited

U.S. PATENT DOCUMENTS 9,392,017 B2 *   7/2016   Cui ........................ G06F 21/54
10,554,683 B1 *  2/2020   Heydari ............... G08G 5/0056
(Continued)

OTHER PUBLICATIONS

Atighetchi, et al.; "A Decision Engine for Configuration of Proactive Defenses—Challenges and Concepts"; 2016 Resilience Week (RWS); pp. 8-12; Aug. 16-18, 2016; 5 Pages.
(Continued)

*Primary Examiner* — Glenford J Madamba
(74) *Attorney, Agent, or Firm* — Daly, Crowley, Mofford & Durkee, LLP

(57) ABSTRACT

A decision engine includes: a genetic algorithm framework including a knowledge base of standard configurations, a candidate selector generator and a selector to select a candidate configuration from a plurality of preferred standard configurations in response to the candidate selector generator; a parallelized reasoning framework including an attack surface reasoning algorithm module to compute the security and cost tradeoffs of an attack surface associated with each candidate configuration; and a user interface framework including a web service engine where users can interact and provide feedback on direction of an evolution used in a genetic algorithm search for evolving defenses.

9 Claims, 30 Drawing Sheets

(51) Int. Cl.
  *G06N 3/12*   (2006.01)
  *G06F 16/242* (2019.01)
  *G06N 5/02*   (2006.01)

(52) U.S. Cl.
  CPC .............. *H04L 41/08* (2013.01); *H04L 41/22* (2013.01); *H04L 63/1433* (2013.01); *G06N 5/022* (2013.01)

(56) References Cited

U.S. PATENT DOCUMENTS

| | | | | |
|---|---|---|---|---|
| 2015/0310188 | A1* | 10/2015 | Ford | H04L 63/0428 726/28 |
| 2016/0357851 | A1* | 12/2016 | Perkins | G06F 16/31 |
| 2017/0104780 | A1* | 4/2017 | Zaffarano | H04L 63/20 |
| 2017/0272242 | A1* | 9/2017 | Morrell | H04L 9/14 |

OTHER PUBLICATIONS

Atighetchi, et al.; "Automatic Quantification and Minimization of Attack Surfaces"; 27th Annual IEEE Software Technology Conference (STC 2015); Long Beach, CA; 2015; 8 Pages.

Atighetchi, et al.; "The Concept of Attack Surface Reasoning"; The Third International Conference on Intelligent Systems and Applications; pp. 39-42; Sevilla, Spain; 2014; 4 Pages.

Ford, et al.; "Implementing the ADVISE Security Modeling Formalism in Möbius"; Dependable Systems and Networks (DSN); 43rd Annual IEEE/IFIP International Conference; pp. 1-8; 2013; 8 Pages.

Heumann, et al.; "Quantifying the Attack Surface of a Web Application"; pp. 305-316; 2010; 12 Pages.

Howard; "Attack Surface: Mitigate Security Risks by Minimizing the Code You Expose to Untrusted Users"; MSDN Magazine; Nov. 2004; 8 Pages.

Jajodia, et al.; "Moving Target Defense: Creating Asymmetric Uncertainty for Cyber Threats"; Advances in Information Security; vol. 54; Springer Science & Business Media; 2011; 200 Pages.

Jansen; "Directions in Security Metrics Research"; U.S. Department of Commerce; Computer Security Division; Apr. 2009; 26 Pages.

Manadhata, et al.; "A Formal Model for a System's Attack Surface"; Moving Target Defense; Springer; pp. 1-28; 2011; 29 Pages.

Manadhata; "An Attack Surface Metric"; IEEE Trans. Software Eng.; vol. 37; No. 3; pp. 371-386; 2011; 165 Pages.

Saitta, et al.; "Trike v.1 Methodology Document"; pp. 1-17; Jul. 13, 2005; 17 Pages.

Shostack; "Threat Modeling: Designing for Security"; John Wiley & Sons; 2014; 625 Pages.

Soule, et al.; "Quantifying & Minimizing Attack Surfaces Containing Moving Target Defenses"; 3rd International Symposium on Resilient Cyber Systems (ISRCS); Philadelphia, PA; 2015; 6 Pages.

Torgerson; "Security Metrics"; 12th International Command and Control Research Technology Symposium; Newport, RI; Jun. 20, 2007; 15 Pages.

Verizon; "2015 Data Breach Investigation Report"; 2015; 70 Pages.

Zilberstein; "Using Anytime Algorithms in Intelligent Systems"; American Association for Artificial Intelligence; AI Magazine; vol. 17; No. 3; pp. 73-83; 1996; 11 Pages.

* cited by examiner

USER INTERFACE SUPPORTING AN INTEGRATED DECISION ENGINE FOR EVOLVING DEFENSES

CROSS REFERENCE TO RELATED APPLICATION

This application claims priority from U.S. Provisional Patent Application Ser. No. 62/488,225, filed on Apr. 21, 2017, which is incorporated herein by reference in its entirety.

STATEMENTS REGARDING FEDERALLY SPONSORED RESEARCH

This invention was made with Government support under Contract No. FA8750-16-C-0205 awarded by the Department of the Air Force. The Government has certain rights in this invention.

FIELD OF THE INVENTION

This disclosure relates generally to techniques to control cyber attacks and more particularly to a decision engine that intelligently searches for optimal cyber defense configurations in a way that leads to continuously improving solutions and uses a multi-dimensional heuristic search across security, cost, or mission attributes.

BACKGROUND

As is known in the art, cyber security remains one of the most serious challenges to national security and the economy that we face today. Systems employing well known static defenses have found themselves increasingly vulnerable to penetration from determined, diverse, and well-resourced adversaries launching targeted attacks such as Spear Phishing and long-term attacks such as Advanced Persistent Threats (APTs). In recent years, a class of proactive dynamic defenses known as Moving Target Defenses (MTDs) has emerged to make entry points into networks and systems harder to detect, to reduce vulnerabilities and make the exposure to those vulnerabilities that remain more transient, and to render attacks against systems less effective. MTDs attempt to reduce and dynamically modulate the attack surfaces of systems, thereby reducing the set of potentially successful attack vectors an adversary can use to compromise a target system.

As the number and complexity of these defenses increase, cyber defenders face the problem of selecting, composing, and configuring them, a process which to date is performed manually and without a clear understanding of integration points and risks associated with each defense or combination of defenses. Better systems are needed to aid cyber defenders performing cyber security.

SUMMARY

In accordance with the present disclosure, a decision engine is provided comprising: a genetic algorithm framework including a knowledge base of standard network configurations, a candidate selector generator and a selector to select a candidate configuration from a plurality of preferred standard configurations in response to the candidate selector generator; a parallelized reasoning framework including an attack surface reasoning algorithm module to compute the security and cost tradeoffs of an attack surface associated with each candidate configuration; and a user interface framework including a web service engine where users can interact and provide feedback on direction of evolution used in a genetic algorithm search.

In accordance with the present disclosure, a method to implement evolving defenses in a network includes: providing a genetic algorithm framework including a knowledge base of standard network configurations, a candidate selector generator and a selector to select a candidate configuration from a plurality of preferred standard configurations in response to the candidate selector generator; providing a parallelized reasoning framework including an attack surface reasoning algorithm module to compute the security and cost tradeoffs of an attack surface associated with each candidate configuration; and providing a user interface framework including a web service engine where users can interact and provide feedback on direction of an evolution used in a genetic algorithm search.

In accordance with the present disclosure, a method of communicating with a user interface by an operator includes: providing feedback on the convergence direction of evolution used in a genetic algorithm search, allowing human input to better guide the search; influencing the search tradeoff between exploration, where the candidate generator can produce largely varying configurations to explore different areas of the search space, and exploitation, where smaller changes are made to a promising high-scoring candidate, to more thoroughly explore a small region of the configuration space; and requesting specific changes to include the use of a specific defense or a restriction on modifying a network resource, to be included in the next generation.

In one embodiment, the method also includes: accessing quantitative results about the currently explored defense configurations to identify the configuration with the highest security given a certain upper limit for cost; accessing the best configurations found so far and determine whether the search is explorative where better results may take many generations to be found or exploitative where better results can be found in a few more iterations.

In accordance with the present disclosure, a user interface for a user operator to interact and provide feedback on direction of an evolution of cyber defenses includes: a user interface framework including a web service engine where users can interact and provide feedback on direction of an evolution of defenses.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
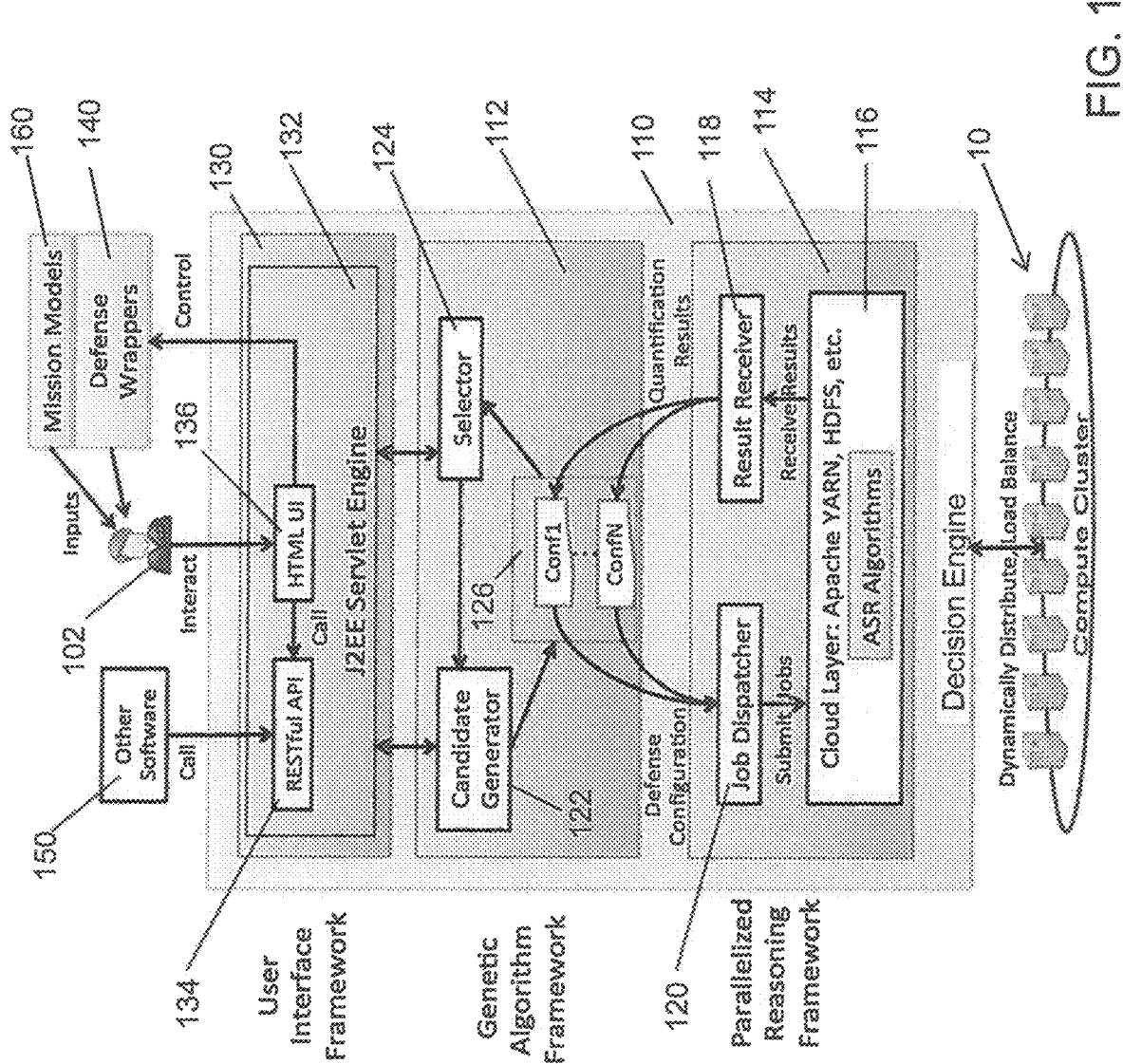
FIG. 1 is a diagram of a decision engine according to the disclosure.

Before departing on a detailed explanation of the system according to the disclosure, it may be helpful to review the challenges and concepts of proactive defensive cyber techniques. In a computing network environment, selecting appropriate cyber defense mechanisms for an enterprise network and correctly configuring them is a challenging problem. Identifying the set of defenses and their configurations in a way that maximizes security without exhausting system resources or causing unintended interference (a situation known as cyber friendly-fire) is a multi-criteria decision problem that is difficult for humans to solve effectively and efficiently. Proactive defenses are especially difficult to configure due to their temporal nature. This disclosure describes the challenges and solution concepts for a decision engine that: (1) intelligently searches for optimal cyber defense configurations in a way that leads to continuously improving solutions; (2) uses compute clusters to scale computation to realistic enterprise-level networks; and (3) presents meaningful choices to operators and incorporates their feedback to guide the search and improve the suggested solutions.

In current cyber warfare, the odds are inherently stacked against the defender. According to one report, attackers were able to compromise an organization within minutes in 60% of cases and many of these attacks can go undetected for months. Cyber attackers frequently automate much of their work through management platforms, such as Metasploit, that enable rapid sharing and reuse of code. Furthermore, malware has evolved to the point where botnets and viruses make autonomous decisions, e.g., to remain dormant if they detect monitoring in an environment or to intertwine attacks with regular user activities to stay within the variance of observable parameters. This level of sophistication and the time pressure introduced by automated execution makes targeted attacks difficult to detect and mitigate.

One way system owners and cyber defenders have responded to counter this threat is to use proactive defenses to make targets less predictable, giving rise to what is known as Moving Target Defenses (MTDs). State-of-the-art MTDs continuously change attack surfaces of applications, hosts, and networks to increase adversarial work load and uncertainty. While there is great value in proactive defenses in general and in MTDs specifically, it is also quite easy to add defenses that provide little added value, introduce unacceptable cost or overhead, inadvertently increase the attack surface, or exhibit unintended negative side effects when combined with other defenses. A Command and Control of Proactive Defense (C2PD) solution is needed to prevent such cyber friendly fire. We envision a decision engine as an integral component of C2PD to help cyber defenders choose from among available proactive defenses, configure deployed defenses, and achieve the best protection for the target system with the least impact on the system's mission effectiveness.

As described in the article "Quantifying & Minimizing Attack Surfaces Containing Moving Target Defenses," by N. Soule, B. Simidchieva, F. Yaman, R. Watro, J. Loyall, M. Atighetchi, M. Carvalho, D. Last, D. Myers, and C. B. Flatley, and presented at the 3rd International Symposium on Resilient Cyber Systems (ISRCS), Philadelphia, Pa., 2015 and incorporated herein by reference, when analyzing a system and assessing its attack surface, one must consider (1) the potential adversary capabilities and starting points, e.g., distinguishing external threats from insider threats, (2) the intra- (among processes) and inter-host connectivity that allow legitimate or malicious actors to move from element to element within the system, (3) which elements are required for operational use, and among those which are required for a given mission, (4) the application and mission level requirements that if unmet lead to degraded operation or failure, and (5) the defenses available for deployment, the potential deployment locations, and the protection they provide. The ASR algorithms and metrics operate over a set of models that together describe the system under examination, its defenses, the assumed capabilities and starting point(s) of the adversary, and optionally a mission, which may operate over the defined system.

Referring now to FIG. 1, a decision engine 110, to be described in more detail hereinafter, will enable defenders to select and configure the most appropriate cyber defenses for a given target environment supporting multiple concurrent mission operations more effectively and efficiently. By automating activities at multiple levels, the decision engine 110 transforms a cyber defense management process that is currently dominated by manual operations into a streamlined computer-assisted workflow, which delegates heavyweight computation to a compute cluster 10 and leverages human insight to guide the search for optimal configurations. Using the decision engine 110, cyber defenders 102 will be able to explore a large space of possible configuration settings in a short amount of time, enabling an agile defense posture that continuously incorporates and adapts defenses based on new proactive defenses that become available, new information about adversarial capabilities, new mission or changing requirements, and/or changes in protected systems. The benefits of the decision engine 110 will apply to a variety of cyber defenders in different environments, including system administrators and other personnel who are responsible for the continued operation of computer systems and networks that might come under attack.

Figure 2:
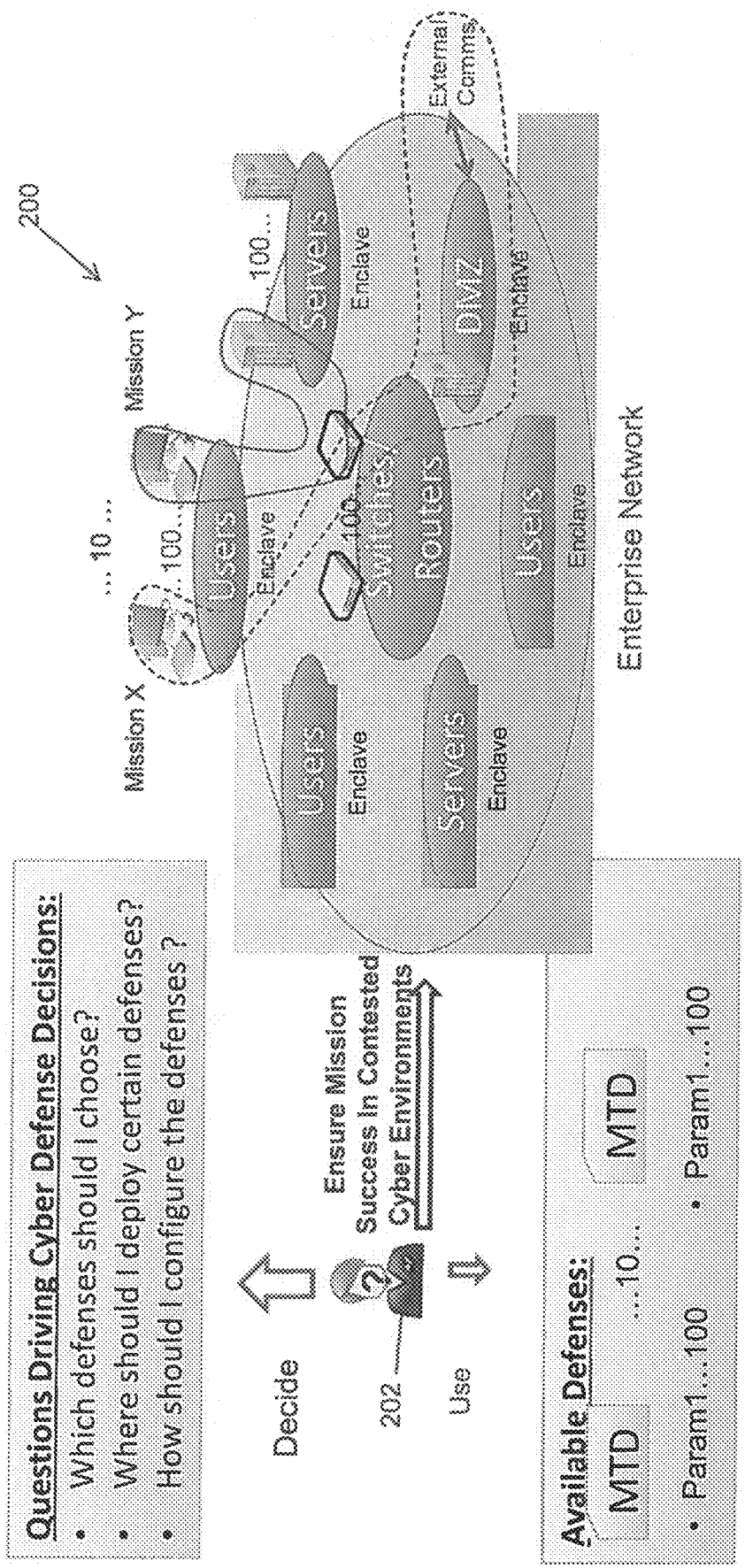
FIG. 2 is a diagram of the cyber defense decision problem cyber defenders are addressing with the system of FIG. 1.

Referring now also to FIG. 2, to illustrate the decision problems that cyber defenders 202 face, consider a simplified example of a network environment typically found in enterprise environments, such as the networks present at a company campus shown on the right of FIG. 2. An enterprise network 200 includes multiple network enclaves each containing hundreds of computing resources, including servers, laptops, and network equipment. Resources in the enclave can be shared among multiple concurrent missions with different requirements on security guarantees (e.g., expressed in terms of availability, confidentiality, and integrity of services and data) and cost (e.g., measured by throughput and latency of information exchanges).

Cyber defenders 202, shown on the left of FIG. 2, are responsible for ensuring mission success by ensuring that the computer and network resources provide the required functionality, even in contested cyber environments involving sustained adversarial activities. To protect the target network and systems, the cyber defenders 202 have access to a number of defenses, including different MTD implementations, each with a different set of parameters and associated security benefit/cost tradeoffs to be described further hereinafter. The main decision problem faced by cyber defenders 202 is composed of the following three parts: Defense Selection, Defense Deployment, and Defense Parameterization. Defense Selection is answering the question "Which defenses should I choose?" The cyber defender 202 needs to choose the most appropriate combination of defenses for the given set of resources, missions, and expected attack types. One key concern for deployment is the desire to create defense-in-depth postures using a strategic combination of defenses that complement each other and require adversaries to overcome multiple hurdles. However, a common problem is concentration on a single type and instance of defense, which can have wide-ranging consequences if adversaries find a bypass or compromise vulnerability for the specific defense. Defense Deployment is answering the question "Where should I deploy certain defenses?" The cyber defender 202 needs to identify the places in the network or platforms to place the selected defense instances. Liberally sprinkling defenses throughout the enterprise network 200 without regard for their resource requirements and interactions can easily become a management nightmare and introduce unacceptable costs, which could cause missions to fail. One driving concern is to ensure defense coverage over the attack surface. For instance, a frequent mistake is to concentrate defenses on the network layer and fail to provide defense coverage on endpoints. Defense Parameterization is answering the question "What parameters should I choose for the defenses?" Once the defense and the deployment targets are identified, the cyber defender 202 needs to ensure that the defenses are configured properly for the systems on which they have been installed. Modern cyber defenses can offer a large set of tunable parameters to adjust. A driving concern is to find parameter settings that maximize security and mission performance while controlling for associated costs. A secondary concern is the desire to create configuration diversity across defense instances to increase adversarial workload.

Given these decision points, cyber defenders 202 in charge of deploying and monitoring defenses face a multi-criteria decision problem well beyond the scale at which a single person can be expected to find optimal solutions by hand. This is particularly true because the criteria involved are not independent of each other, requiring search across a large space of interacting possible candidate configurations. Manual approaches generally turn into frustrating tasks of continually tweaking candidate configurations, may devolve to random walk searches, and are not the best use of human time and expertise. In addition, it is also hard for humans to notice when a radically different candidate configuration change is warranted, e.g., due to a few changes in mission requirements. Human-only approaches suffer from a knowledge transfer problem as new cyber defenders require significant training and knowledge transfer associated with staff rotation. The decision engine 110 automates the tedious manual activities associated with exploration of defense performance while at the same time leveraging human intuition and experience to help guide the search for optimal defense selection, deployment, and parameterization. The combination of these data along with the semantic representation of network, system, attack, and defense models form a candidate configuration to be evaluated by the decision engine 110. The decision engine 110 provides a feasible solution as fast as possible, using further time and resources to refine the candidate configuration or explore a wider set of options by finding alternate candidate configurations that either favor different cost/security tradeoffs or lead to structurally different deployments. To achieve scalability and minimize decision latencies, the implementation of the decision engine 110 strategically combines anytime search with big-data processing.

FIG. 1 shows the overall architecture of the decision engine 110 as a collection of three frameworks: a genetic algorithm (GA) framework 112, a parallelized reasoning framework 114 and a user interface framework 120. The genetic algorithm (GA) framework 112, shown in the middle of the figure, implements an anytime search, to be described further hereinafter, across defense configurations 126 to generate candidate configurations, evaluate candidates using ASR algorithms and select best candidates for the next round. A Candidate Generator 122 constructs new defense configurations 126 to consider using multiple methods, including (1) a knowledge base of previous operator-selected standard configurations, (2) genetic crossover and random mutations of high-scoring candidates from the previous iterations of the search algorithm, and (3) mixed-initiative guidance provided by human operators. The GA framework 112 uses the parallel reasoning framework 114 discussed below to compute fitness scores over security and cost tradeoffs by running ASR algorithms on particular configurations and collecting metric scores. Upon receiving results, a Selector 124 choose a subset of the higher-scoring configurations as input for the next round of candidate generation. The parallelized reasoning framework 114 controlled by a job dispatcher 120 computes the security and cost tradeoffs of the attack surface associated with each one of the candidate defense configurations 126 using ASR algorithms 116 referred to as Attack Surface Reasoning (ASR) techniques. A result receiver 118 provides the results of each candidate defense configuration analysis to the genetic algorithm framework 112 for consideration. Multiple candidate configurations can be computed independently of each other, allowing for effective parallelization using cloud-computing substrates. The user interface framework 130 includes a web service engine 132 with a HTML user interface 136 to interact with cyber defenders (also referred to as operators or users) 102 to allow users to provide insights and guidance and to allow users to understand and influence a search. The cyber defenders 102 are receiving mission models 160 for consideration and interacting with the decision engine 110 can institute control defense wrappers 140 on the network. Other software 150 may also be utilized using an API 134 to interact with such software.

As described in the article "Using Anytime Algorithms in Intelligent Systems" by S. Zilberstein and published in *AI Mag.*, vol. 17, no. 3, p. 73, 1996 which is incorporated herein by reference, desired properties of anytime algorithms include the following features: First is measurable quality: The quality of an approximate result can be determined precisely. For example, when the quality reflects the distance between the approximate result and the correct result, it is measurable as long as the correct result can be determined. Second is recognizable quality: The quality of an approximate result can easily be determined at run time (that is, within a constant time). For example, when solving a combinatorial optimization problem (such as path planning), the quality of a result depends on how close it is to the optimal answer. In such a case, quality can be measurable but not recognizable. Third is monotonicity: The quality of the result is a nondecreasing function of time and input quality. Note that when quality is recognizable, the anytime algorithm can guarantee monotonicity by simply returning the best result generated so far rather than the last generated result. Fourth is consistency: The quality of the result is correlated with computation time and input quality. In general, algorithms do not guarantee a deterministic output quality for a given amount of time, but it is important to have a narrow variance so that quality prediction can be performed. Fifth is diminishing returns: The improvement in solution quality is larger at the early stages of the computation, and it diminishes over time. Sixth is interruptibility: The algorithm can be stopped at any time and provide some answer. Originally, this was the primary characteristic of anytime algorithms, but can show later that noninterruptible anytime algorithms, termed contract algorithms, are also useful. Seventh is preemptability: The algorithm can be suspended and resumed with minimal overhead. We have determined that implemental an anytime algorithm in the decision engine 110 efficiently selects the desired countermeasure for the current environment.

Suffice it to say here, the anytime algorithm implemented in the decision engine 110 in the genetic algorithm framework 112 as described above generate candidate configurations through knowledge base or mutations, scores each configuration through ASR via parallel reasoning, weighs the scores using the selectors to determine the best subset, report any interesting solutions to the User Interface, and finally cycle back to the first step and generate more configurations. This cycle repeats until a defined stopping condition is met, either number of iterations or score thresholds have been met. The selectors are weighted sum functions of the individual metrics computed by ASR and additional metrics described below (Solution Uniqueness Value) and (Defense Conflict Index). These weighted sum functions return a single numerical value that represents the score from that selector for a given configuration. By ranking these scores and selecting the top N (where N is a configurable parameter), the algorithm produces a set of best configurations. These best configurations are then used as input to the mutation operators that generate the next round of configurations. These mutation operators select one or two elements of the best configuration set and modify them by either changing a parameter or location of a defense, or combining defenses from two configurations, to create a new configuration.

The score for a specific configuration is a weighted sum of the individual metrics and the algorithm stores the raw metric values, these scores are measurable and recognizable, satisfying the first two features of an anytime algorithm defined above. The best configurations found so far are always available to the operator, satisfying the monotonicity property. Consistency and diminishing returns are verified experimentally and the degree to which these properties are satisfied is dependent on the specific scenario. This algorithm is interruptible, since it can be terminated at any iteration, and pre-emptible, since it can be started from any existing generation by loading that generation in from storage, executing the quantifier to score the current generation if quantification was not completed before the algorithm was terminated and continuing the main processing loop from there.

Figure 3:
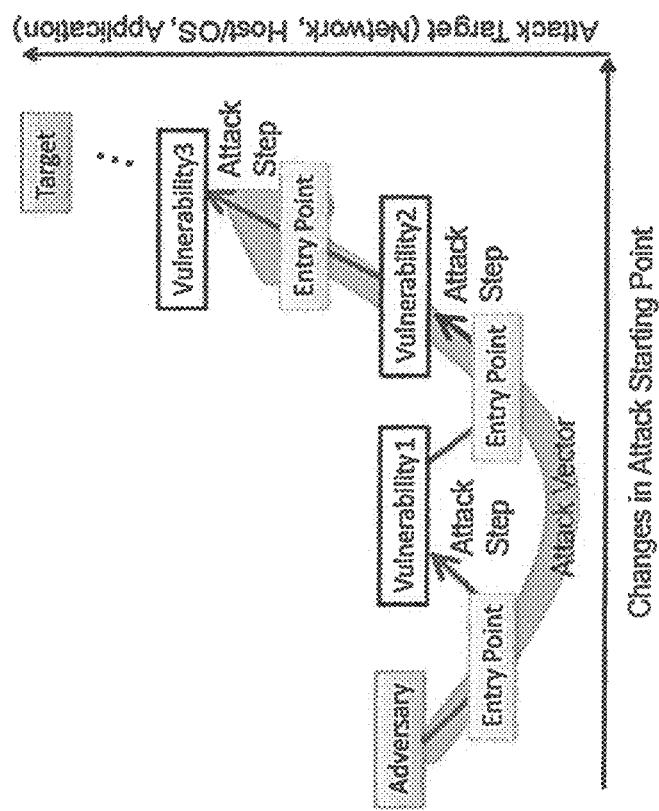
FIG. 3 is a graph showing changes in attack starting point.

As described in the article "The Concept of Attack Surface Reasoning" by M. Atighetchi, N. Soule, R. Watro, and J. Loyall, and published in *The Third International Conference on Intelligent Systems and Applications*, Sevilla, Spain, 2014, which is incorporated herein by reference, an AI-inspired approach for modeling and analyzing the attack surface of a distributed system with the models, metrics, and algorithms used in measuring attack surfaces need to support the following key requirements. The attack surface model needs to represent concepts and defenses situated at multiple layers. Attacks may target resources at the network layer (both network traffic observed on intermediary network components between the client and the server as well as the Transmission Control Protocol (TCP)/Internet Protocol (IP) stacks of servers and clients), the operating system and host layers (e.g., by running attacks against a Java Virtual Machine (JVM) compute platform), and the application layer (e.g., by corrupting Structured Query Language (SQL) tables). We refer to this requirement as vertical layering, as visualized by the attack vector in FIG. 3 as it moves from Vulnerability 2 to Vulnerability 3. The attack surface model needs to capture ordering dependencies between control and data flows and defenses to be employed against attack vectors. Attacks consist of an orchestrated execution of individual attack steps, where the effectiveness of each attack step is contingent on the starting point (and level of privilege) in relation to the specific target. For instance, network attacks launched from a legitimate client have a significantly different starting point compared to the same attacks launched from an adversary-controlled device attached to the network. This knowledge should be part of the attack surface model. An example of ordering at a given vertical layer includes a firewall placed in front of a protected host, requiring all traffic to pass through the firewall first before reaching the host's TCP/IP stack. We refer to this requirement as horizontal layering, as visualized by moving from Vulnerability 1 to Vulnerability 2 in FIG. 3. The attack surface models need to capture complexities associated with dynamic defenses. Many of the attack effects are difficult to detect automatically and cause observable events only when critical mission functionality starts failing, leaving little time for recovery and increasing the impact of the attack. While proactive shaping strategies, such as IP Hopping, Operating System (OS) masquerading, unpredictable replication, and Address Space Layout Randomization (ASLR) are clearly beneficial, the existence of multiple dynamic adaptations at different system layers makes management of the overall policy and configuration sets deployed on the target devices challenging. A multilayer attack surface randomization and minimization, consisting of a single Server may include three MTDs: (1) IP Hopping that randomizes IP addresses between the client and server at the network layer, (2) OS masquerading that changes parameters in the OS stack to make one OS look like another, and (3) Process variants that generate different functionally equivalent versions of binaries and replicas. The overall goal of ASR is to quantify the attack surface along two main attributes—minimization and randomization—with the objective of minimizing access where possible and randomizing information about remaining access where affordable.

The algorithms to compute minimization rely on the system and mission models and metrics to determine how much of the attack surface really needs to be exposed to effectively function for a mission or, conversely, the parts of the attack surface that can be reduced or removed without adversely affecting critical mission functionality. For example, some applications with external facing interfaces (thereby providing entry into the system if penetrated) might not be needed during some phases of mission operation—or might not be as critical—and can be shut down, removing those entry points into the system and their associated vulnerabilities and attack vectors. The algorithms to compute randomization execute over the models and metrics for a system deployment and a set of defenses, including MTDs, and compute how the defenses or combination of defenses change the attack surface.

Figure 4:
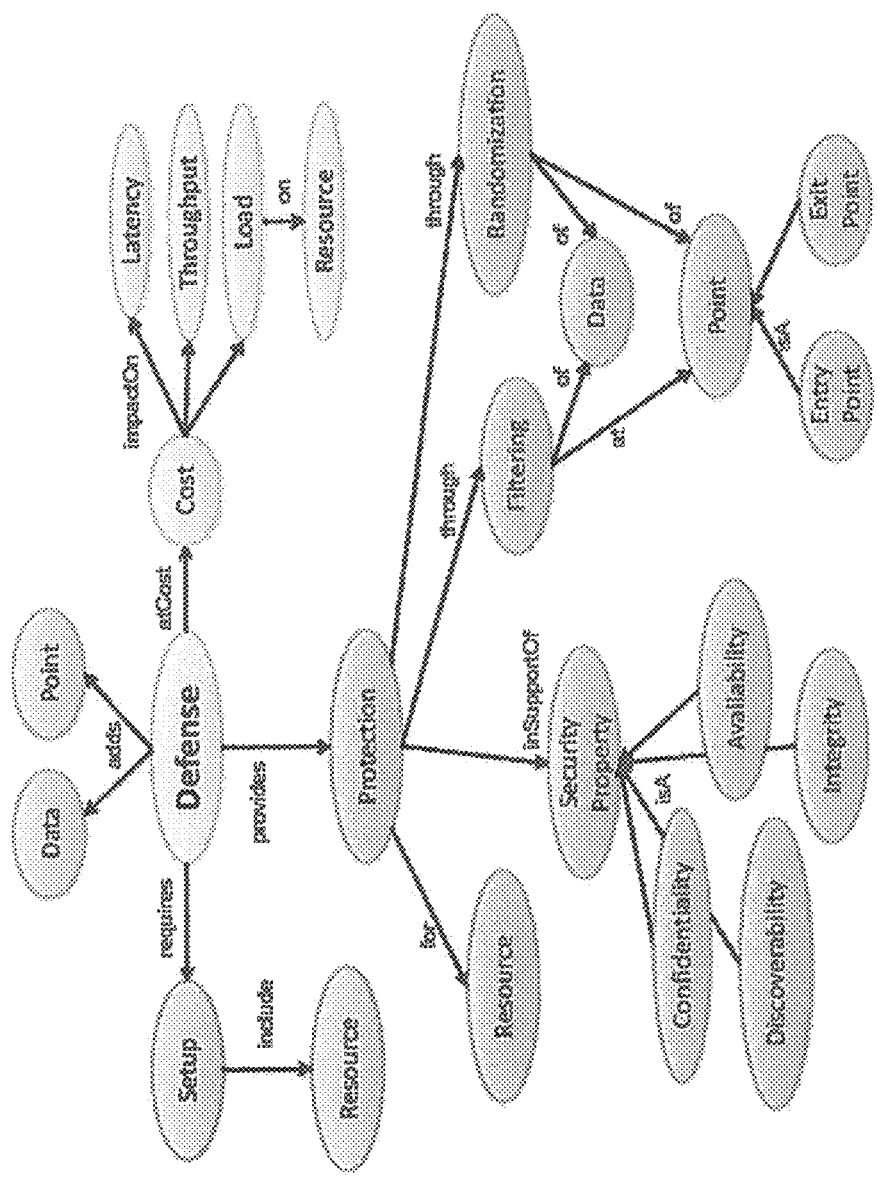
FIG. 4 is an ontology representation of a generic dynamic defense.

Modeling an attack surface involves linking several different models, each representing aspects of the defended system. An attack model, describing goals of an attack, together with starting points, can be used to evaluate the attack surface for randomization attributes. The mission model, describing the set of required interactions in support of mission critical functionality, can be used to minimize access by pruning unnecessary access paths and highlighting those elements most important to mission success. FIG. 4 displays a high-level ontological view of a defense model and shows how a defense is described by a setup over a set of resources. For IP hopping, the setup contains the set of machines that have access to the hopping scheme's secret key and can therefore compute what the next IP address is going to be. Attacks that start from the hosts that are part of the setup are not impeded in any way by the defense, since they all have access to the secret key of the hopping scheme and therefore perceive no randomization. FIG. 4 also shows that a defense provides protection for a set of resources, as expressed by the Defense→provides→Protection link. We model the type of protection provided in terms of overall security benefit, including confidentiality, integrity, availability, and discoverability. Furthermore, we express the mechanism of protection that the defense imposes. The Protection→through→Filtering link captures any security check that explicitly drops data, e.g., as it is being flagged by anomaly detection at various layers. The Protection→through→Randomization link captures aspects of dynamism associated with proactive shaping strategies. As shown in FIG. 4, the protections directly link to the scope of the defense, in terms of entry points, exit points, and data, which are key aspects of our definition of the attack surface. Finally, each defense has a cost associated with it (as shown to the right of FIG. 4). We include the fact that defenses can increase the attack surface via Defense→adds→Data and Defense→adds→Point links.

The randomization, minimization, and other characterization metrics and analyses provided by ASR share an underlying common base of feasible-path analysis, but can be classified into distinct groups based on the operations that occur post-path-determination. Metric Computation allows for calculation of metrics describing the randomization, minimization, or other characteristics of a point, path, or system, including the metrics in Table 1.

TABLE 1

| Randomization |
| --- |
| Number of defenses with dynamic modulation frequencies greater than any applicable attack phase duration |
| Defense modulation frequency |
| Number of dynamic surfaces |
| Number of dynamic surfaces per protection type (confidentiality, integrity, availability, discoverability) |
| Minimization |
| Number of deployed defenses |
| Attack surface area change due to defenses |
| Number of defense boundaries crossed per path |
| Number of paths with less than N defenses |
| Rule granularity of defenses |
| Number of processes |
| Number of open ports |
| Number of users |
| Other Characterizations |
| Sum of path lengths from entry point to each defense |
| Is there at least 1 defense per known attack class |
| Number of paths with conflicting defense types |
| Number of entry points without a defense within 1 hop |

Path Comparison calculations execute path differencing and comparison algorithms to determine the set of elements in a system that are not required to support a given mission, and the disabling of which will help reduce the attack surface with-out degrading operation.

Path Enumeration analyses are undertaken to discover points, paths, and system configurations that exhibit certain properties, such as all paths that contain defenses with dynamic frequencies less than 5 minutes.

Figure 5:
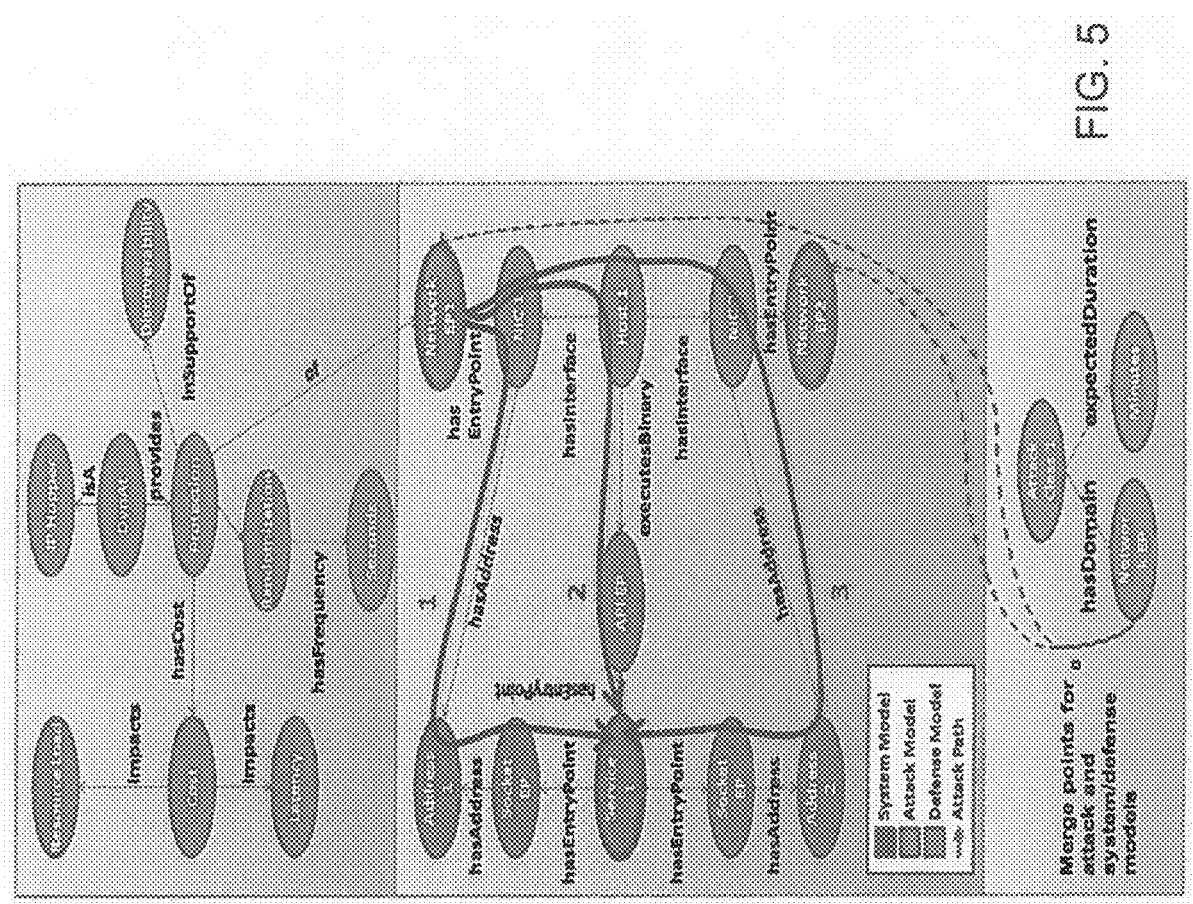
FIG. 5 is an example of an attack surface model used for analysis.

FIG. 5 depicts an example system model and defense model which, when integrated, form an attack surface model, along with an accompanying simplified attack model. The system model, shown in blue in the center, describes a single host with two network interface cards (NICs), through which a single service may be accessed. The service is also exposed internally on the host via an Application Programming Interface (API). A single defense has been modeled in the nodes at the top, in this case an IP hopping MTD named DYNAT and described in article entitled "Dynamic approaches to thwart adversary intelligence gathering" by D. Kewley, R. Fink, J. Lowry, and M. Dean, and published in "DARPA Information Survivability Conference & Exposition (DISCEX), 2001, vol. 1, pp. 176-185. The MTD has been configured to protect the IP address of NIC 1 on Host 1. An attack class, shown at the bottom, has been modeled (in an abbreviated form) describing an attack category that is relevant to network endpoints. Given a model such as this, ASR's processing engine allows for the performance of many interesting analyses and metric computations. For example, in order to determine how many paths are protected by defenses that change more slowly than some known attack class's expected duration (and are thus not dynamic enough to provide robust protection), one may compute the metric number of defenses with dynamic modulation frequencies greater than any applicable attack phase duration. Calculation of this metric is accomplished by first performing a path analysis identifying all possible paths through the system—for this example binding the starting points to network entry points (thus ignoring insider threats) based on the given attack model domain and binding the goal states to all "services." Given these starting points and goals, six possible attack paths exist. FIG. 5 shows three of these paths (paths 1, 2, 3), with the other three being symmetric mirrors, starting from Network EP 2. The ASR path analysis engine will identify the paths starting from the two network entry points (Network EP 1, and Network EP 2) and branching from there to go directly to Service 1 (via path 1 and its symmetric equivalent), indirectly to Service 1 through the API (via path 2 and its symmetric equivalent), or indirectly through the opposing NIC (via path 3 and its symmetric equivalent). At this point the identified paths are stored such that they may be re-used for multiple queries in the second phase of analysis.

The second and third phases for the metric in question involves executing SPARQL Protocol and RDF Query Language (SPARQL) queries (to identify all defenses meeting the pre-scribed criteria) and aggregation operations (here, a simple sum) over the set of paths. Three of the feasible paths (paths 1, 2, and 3) encounter an MTD whose randomization frequency is on the order of seconds. Since the attack in the simplified attack class model has an expected duration on the order of minutes, the MTD is determined to provide adequate protection (for the paths it covers) and thus this metric will have a value of 0, i.e., there are no defenses with dynamic modulation frequencies greater than the attack phase duration. However, determining the overall protection of this system should evaluate this metric in the context of other important metrics. For example, calculating the metric number of paths with fewer than N defenses would highlight that entry through NIC 2 is unprotected. Further, had the metric been defined to include a larger set of starting points the resulting value would have been even larger, as insider attacks that start from a privileged base on Host 1 will not pass through any defense.

In addition to the base path exploration, many other analyses may be performed. For example, the user may wish to elaborate on the numeric value calculated as part of the number of paths with fewer than N defenses metric by drawing from the enumeration category of analyses to ask ASR to identify all paths that include less than one defense. Again, a SPARQL query is defined to operate over the initial set of feasible paths and selects only those that include no defenses.

Figure 6:
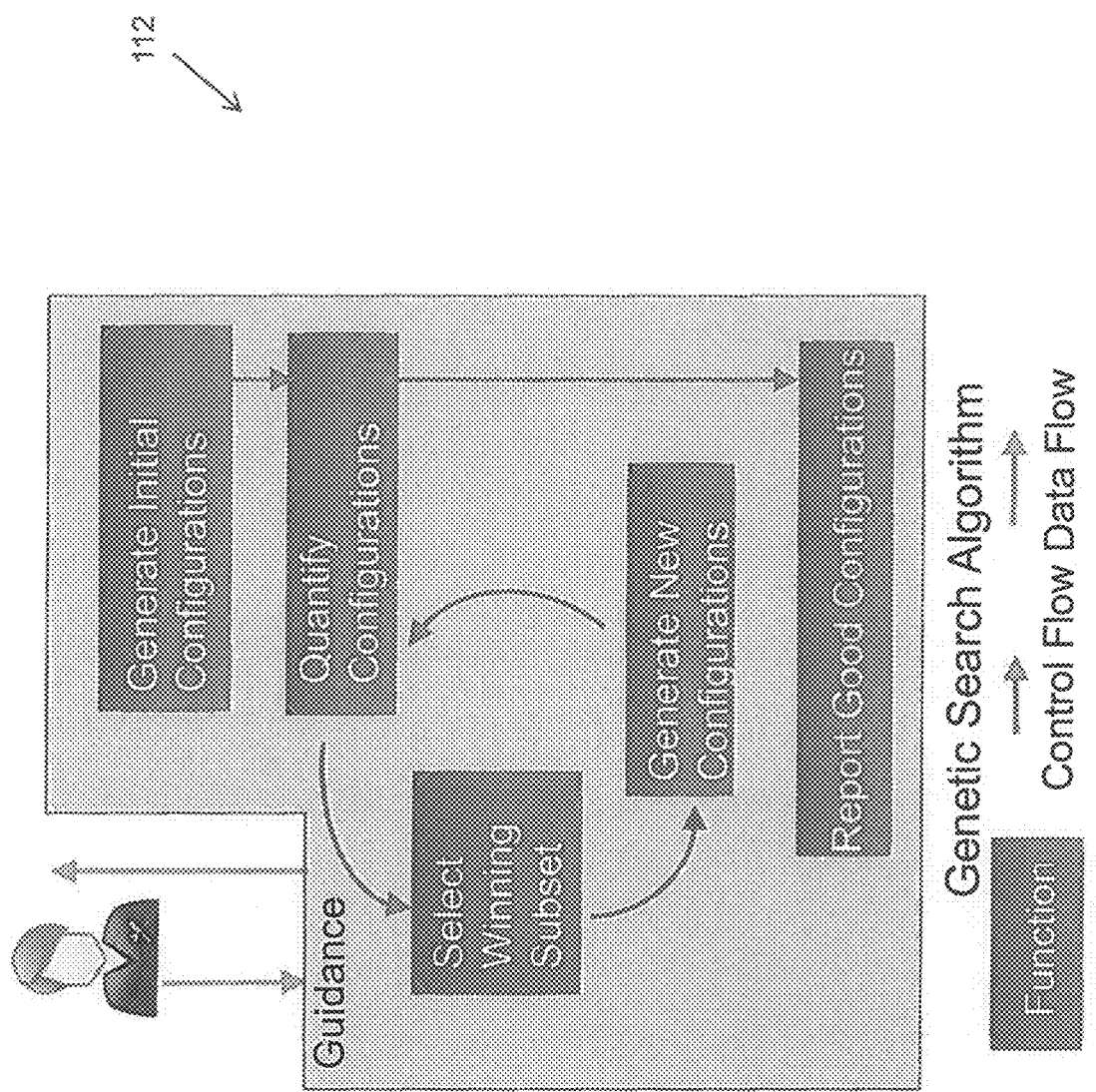
FIG. 6 is a diagram of the Genetic Algorithm Framework.

In one exemplar scenario based on DoD capability readiness exercises in which ground forces are directing an aircraft providing Close Air Support (CAS) via video and image annotation, an Unmanned Aerial Vehicle (UAV) is collecting video and still imagery, which it submits to a publish/subscribe-based Information Management System (IMS). The IMS disseminates both video and images to two clients: A Joint Terminal Attack Controller (JTAC) over a mobile tactical network and a Tactical Operation Center (TOC) client over a Local Area Network (LAN). The IMS is connected to a database for persistence of data received. Finally, an administrator can change settings in the IMS through an administrative client. This network can be protected by three types of defenses, IP Hopping, OS Hopping, and Single Packet Authentication, each of which protect certain endpoints, hosts, or dataflows, and each instance has configurable parameters such as frequency of hopping or number of backing servers. In addition, the decision engine takes as input a mission model which provides additional throughput and latency constraints on specific dataflows, in order to ensure that the network can still provide necessary service guarantees. Referring now also to FIG. 6, all of these inputs are provided to the Anytime Search algorithm, which starts by executing the Generate Initial Configurations step, which uses two generators to create an initial population of configurations. First, it loads a set of pre-defined configurations from a knowledge base that is populated by experienced users with configurations that have been employed in the past that the user believes are good starting points. Second, the population is filled out by using the Random Generator which creates candidate defense configurations by randomly picking a defense type (e.g. OS Hopping), a location (e.g. the IMS host), and values for each configurable parameter. After a sufficient set of candidates are generated, (30 in this exemplar scenario), they are sent to the Parallel Reasoning framework for quantification. The Parallel Reasoning quantifier determines how many compute nodes are available, assigns each node a portion of the population, and uploads the assigned configurations to HDFS (the distributed file system used by the Parallel Reasoning framework). The Parallel Quantifier then computes the metrics for Solution Uniqueness Value (SUV) and Defense Conflict Index (DCI) locally, and waits for the compute nodes to finish and publish the resulting ASI/ACI/ and AMI metrics back to HDFS. Once the scores are available, they are entered into each selector's fitness function, and the resulting fitness scores are ranked. The default selectors include a High Security selector, which weights the Aggregate Security Index (ASI) highest (80%), giving a little weight to the Aggregate Cost Index (ACI) (10%) and Aggregate Mission Index (AMI) (10%), and a Low Cost selector, which gives the more weight to ACI (60%), with ASI at 20% and AMI at 20%. Finally, a High Uniqueness selector gives weight to SUV (40%), with the remaining 60% distributed to the other metrics. Each of these selectors is then given a percentage of the winning set to compute. The initial conditions are to give the High Security selector half (50%), the Low Cost selector half (50%), leaving no weight for the High Uniqueness selector. The High Uniqueness selector is effectively held in reserve until the user desires for more different solutions, in which case the weight for the High Uniqueness selector can be increased. These selectors implement a weighted sum fitness function that combines the individual metric scores into a single value. Each configuration is then ranked according to this value, and a smaller subset of the highest ranking configurations is then chosen to serve as the base configurations for the next generation. The next generation is created from these base configuration by employing one of three mutation methods, chosen randomly. The mutation method creates a new configuration by making a single change to one configurable parameter for one defense configuration. The crossover method takes a subset of the defenses in one base configuration and combines them with a subset from another base configuration. Finally, the Add or Remove defense method either adds a new randomly generated defense configuration to the set from a base configuration, or removes one. These newly generated configurations form the next population and the cycle repeats.

In this example, a high security and high cost solution involving placing a fast configured IP hopping defense on the database server is usually found early and reported to the user interface. The search progresses considering many other candidates before reporting on another slightly lower security, with lower cost, solution involving a set of IP hopping defenses configured to hop more slowly. The user can then choose to implement one of those solutions, or guide the search to consider different solutions.

The Parallel Reasoning system is based on the Apache YARN framework. The framework can run on a single node, or a cluster of any number of compute nodes. One of the compute nodes is designated the "master" and the others are all "workers". Once the Anytime Search algorithm has generated a set of N configurations that are ready for scoring, the entire set is presented to the master. The master, using the Apache YARN framework, divides up the set of configurations to score among the worker nodes, and passes the necessary inputs to the worker nodes through the Hadoop Distributed File System (HDFS). Each worker node executes the ASR algorithm on a candidate configuration and sends back the computed scores to the master, which collects all scores and reports them back to the Anytime Search algorithm.

Figure 7:
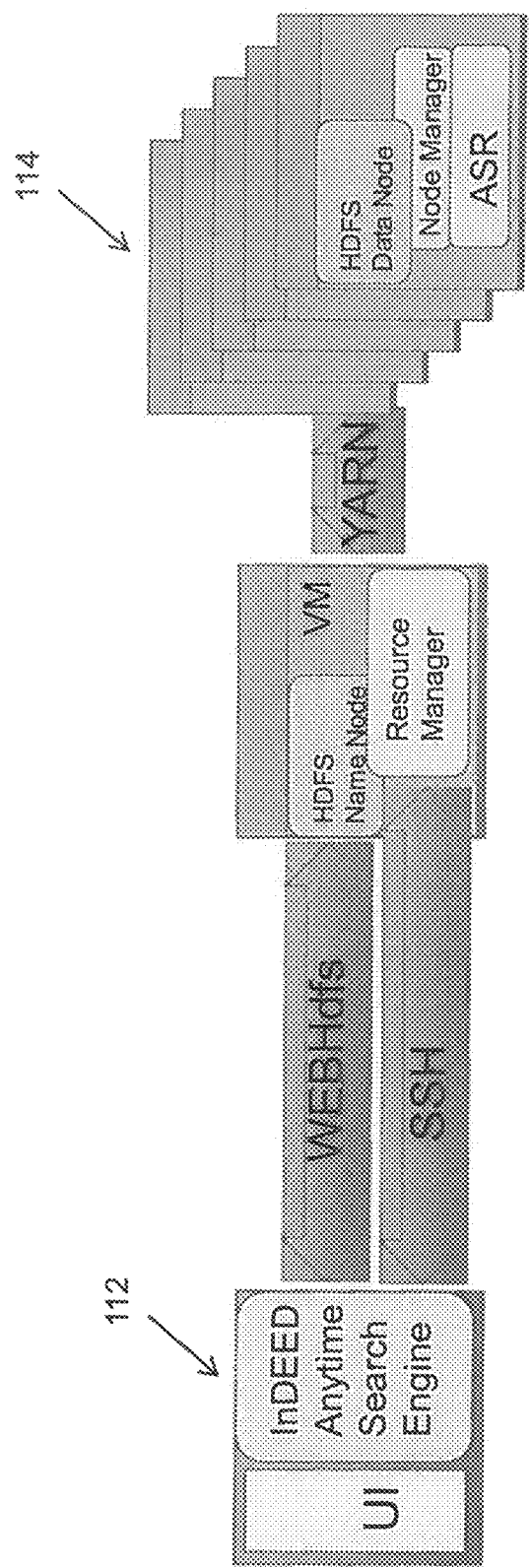
FIG. 7 is a diagram of the Parallelized Reasoning Framework.

Referring now to FIG. 7, a block diagram of the parallelized reasoning framework 114 is shown where the Anytime Search algorithm can be running on a computer external to the compute cluster used for the YARN framework. Even if Anytime Search is running locally on the cluster, we use the same protocols to communicate to the parallelized reasoning framework. First, the Anytime Search algorithm opens a Secure Shell (SSH) connection to one node in the compute cluster designated as the "master". Commands are sent to this node to verify that the YARN cluster is up and operational, and to start it if not. The Anytime Search algorithm uploads the base models that ASR needs to compute, that do not depend on a specific defense configuration, to the HDFS file system through the WebHDFS protocol. The HDFS system then ensures that these base models are available on each compute node. Then, when the Anytime Search algorithm has a population of defense configurations to quantify, it writes out the configurations to a text file and uploads the set of files to WebHDFS. Finally, the Anytime Search algorithm sends a command via SSH to trigger the computation. This causes an application to execute on the "master" node that assigns each configuration to one of the available compute nodes, spawns a compute job on each compute node, and waits for completion of that job. The compute jobs upload the resulting metric scores computed by ASR to HDFS. Finally, this master application terminates when all compute nodes are done, signaling the Anytime Search algorithm that it can begin downloading the results from HDFS through WebHDFS. The User Interface (UI) framework 130, shown at the top of FIG. 1, enables operators to provide feedback on the direction of evolution used in the GA search, allowing human input to better guide the search. Human operators 102 can influence the search tradeoff between exploration, where the candidate generator 122 can produce largely varying configurations to explore different areas of the search space, and exploitation, where smaller changes are made to a promising high-scoring candidate, to more thoroughly explore a small region of the configuration space. For ultimate control, operators 102 can request specific changes, e.g., the use of a specific defense or a restriction on modifying a network resource, to be included in the next generation. In addition, operators 102 can access quantitative results about the currently explored defense configurations, e.g., to identify the configuration with the highest security given a certain upper limit for cost. At any time, the operator 102 can access the best configurations found so far and determine whether the search is explorative (better results may take many generations to be found, if at all) or exploitative (better results can be found in a few more iterations).

Figure 8:
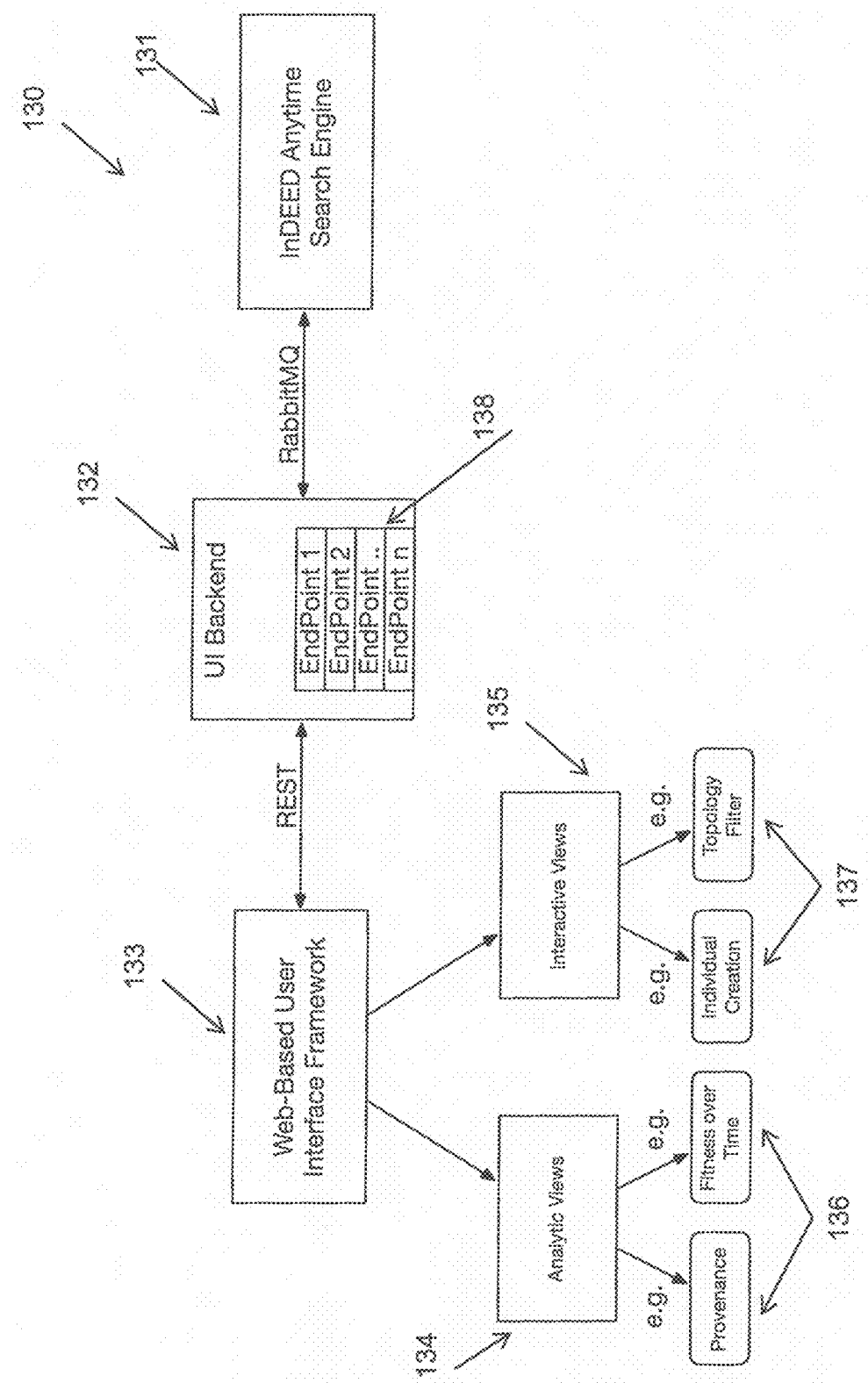
FIG. 8 is a diagram of the User Interface Framework.

Referring now to FIG. 8, a diagram of User Interface (UI) framework 130 is shown where the InDEED Anytime Search Engine 131 provides data to the UI Backend 132 that formats the data for visual display to the operator in the Web-based User Interface Framework 133. The UI Backend 132 responds to the data queries from the Web-based User Interface Framework 133 through a set of RESTful Endpoints 138 that access the stored data from the InDEED Anytime Search Engine 131. The Web-Based User Interface Framework 133 contains both Analytic Views 134 of the GA search data which may display provenance or fitness over time data 136 and Interactive Views 135 that enable the operator to impart information to direct the direction of the search either through the introduction of new individuals to include in the GA population or through topology filters 137 that either require or prohibit the deployment of defenses in particular locations.

The decision engine 110 needs to take into account constraints from IT infrastructures, adversary capabilities, and mission operations to identify the best security possible at an acceptable cost. Solving utility functions for more than one constraint is very difficult for humans to manage. Our approach for solving the defender's multi-criteria decision problem involves anytime search over the set of possible candidate configurations (i.e., what, where, and how to deploy defenses) in a practical way that hides much of the complexity from the user defender and presents results in easy to understand and quantitative way. As described above, the anytime search is described in more detail in the article by S. Zilberstein, entitled "Using anytime algorithms in intelligent systems" published in *AI Mag.*, vol. 17, no. 3, p. 73, 1996. Leveraging capabilities developed under ASR, the decision engine 110 builds on previous work on quantifying the attack surface of a candidate configuration through a fitness function F over three aggregate level indexes namely the Aggregate Security Index (ASI), Aggregate Cost Index (ACI), and Aggregate Mission Index (AMI) as described in the articles "Automatic Quantification and Minimization of Attack Surfaces," by M. Atighetchi, B. Simidchieva, N. Soule, F. Yaman, J. Loyall, D. Last, D. Myers, and C. B. Flatley, and presented at the 27th Annual IEEE Software Technology Conference (STC 2015), Long Beach, Calif., 2015; "Quantifying & Minimizing Attack Surfaces Containing Moving Target Defenses" by N. Soule, B. Simidchieva, F. Yaman, R. Watro, J. Loyall, M. Atighetchi, M. Carvalho, D. Last, D. Myers, and C. B. Flatley, and presented at the 3rd International Symposium on Resilient Cyber Systems (ISRCS), Philadelphia, Pa., 2015; and "The Concept of Attack Surface Reasoning" by M. Atighetchi, N. Soule, R. Watro, and J. Loyall, and presented in The Third International Conference on Intelligent Systems and Applications, Sevilla, Spain, 2014.

An example of utilizing Aggregate Security Index (ASI), Aggregate Cost Index (ACI), and Aggregate Mission Index (AMI) within the decision engine 110 follows. The initial configuration generated by the Random generator step of the Anytime Search algorithm for the DoD exemplar scenario described above, include a configuration that places an IP Hopping defense called ARCSYNE protecting the link between the Admin server and the IMS server as well as a Single Packet Authorization (SPA) defense protecting another endpoint on the IMS server. The ASI score for this configuration was 60.0, with an ACI of 18.4 and AMI of 25.0. These scores were above the threshold values defined by the operator, so this configuration was reported to the user as the first viable solution found. As the Anytime Search algorithm continued, 80 other configuration were scored until a configuration was found that used a combination of a VPN defense and ARCSYNE, this scored the same on ASI and AMI but lower ACI (14.9), and thus was reported to the user as an interesting solution. Finally, after 160 configuration were evaluated, another solution involving two extra SPA defenses in addition was discovered that had a higher ACI (41.0), but a much higher ASI (104). This configuration provided much more security at a higher cost, and was also reported to the user. Finally, the algorithm found another solution in between with ASI of 85 and ACI of 23, which provided the best combination of security and cost, involving a single SPA defense, a VPN, and an instance of ARCSYNE.

In addition, the decision engine 110 provides additional metrics for inclusion into the fitness function, namely a Defense Conflict Index (DCI) and Solution Uniqueness Value (SUV). The Defense Conflict Index (DCI) is an aggregate of two sub-metrics. First, a knowledge base of known defense interactions is loaded, which consists of experiment reports from live experiments where multiple defenses were tested operating on the same host. If these tests indicate a potential conflict where the defenses operated differently together than separately, a high DCI score is returned, indicating a likely conflict would result if this set of defenses was instantiated. Since the number of potential interaction effects scales quadratically with the number of defense types, the second submetric considers the potential for unknown conflicts between untested defense sets. This submetric computes the likelihood of an unknown conflict by executing queries over the models of the defenses looking for shared resources, hosts, or components requiring configuration. These submetrics are combined to produce the DCI value. The SUV metric (Solution Uniqueness) computes the similarity of a set of defenses to the current set of defense configurations with the best scores that have been reported to the user. The similarity is computed by examining every configurable parameter (including the location of the defense), and returning a score with higher values when parameters area closer. Sets of defenses are compared by finding the most similar pair, removing them from consideration, and then finding the next most similar pair, and iterating until all defenses have been considered. Note that metric values are turned into ratios for metrics where lower means better. These metrics not only cover criteria related to security, cost, and mission-impact, but also capture the risk of functional incompatibilities between multiple defenses (DCI) and enable operators to provide guidance in the search for optimal configurations (through the SUV). Furthermore, the decision engine 110 enables operators to define multiple selectors, each with a specific set of weights used for the calculation of a fitness function. The overall search process can use a combination of selectors, e.g., to focus on finding the most secure configurations initially (through a selector with a proportional high weighting factor for the ASI) while switching over the search to minimizing cost later on (through a selector with a proportional high weighting factor for the ACI).

The decision engine 110 provides the operator 102 a targeted what-if capability. As new defenses become available and situations change in environments where defenses are already deployed, it is desirable to do quick reevaluations. Furthermore, drastic changes to already deployed components are untenable in operational environments during live mission execution. For these reasons, the decision engine 110 needs to support targeted exploration through a what-if capability. The decision engine 110 provides a directed model-based user interface (UI) using the user interface framework 120 that enables operators 102 to inject their knowledge and constraints into the search and decision-making process, e.g., by removing a specific defense instance or all instances of a specific type, making specific changes to defense parameters, or changing the importance of features in the evaluation function. This enables cyber defenders to start with a candidate configuration and study the impact of specific changes prior to deployment.

The decision engine 110 provides the operator 102 the ability to identify unintended interaction effects across defenses. Deploying multiple cyber defenses into a network can easily lead to cyber friendly fire. The decision engine 110 needs to deconflict multiple defenses by reasoning about unintended side effects and competing requirements on security and cost. This is done by computing the DCI metric as described above. The decision engine 110 utilizes Attack Surface Reasoning (ASR) techniques to identify interaction effects introduced by software dependencies and information that is required to be static by some defenses but dynamically varied by others, and introduce the new Defense Conflict Index to quantify these effects. For example, experimental results indicate that a specific implementation of an OS Hopping defense interacted with a Single Packet Authentication defense when both were running on the same host, resulting in a failure of the SPA defense to provide any security. The DCI submetric for known interactions will produce a large value for any configuration with this condition. For a different IP Hopping implementation, we have no experimental results running on the same host as an SPA defense. Any configuration set including IP Hopping and SPA running on the same host (but on different network cards) will have a low DCI value, but non zero, indicating the potential for an unknown conflict. If the two defenses run on the same network on the same host, the DCI score will be higher.

The decision engine 110 needs to operate at realistic scale, tempo, and fidelity. To assist cyber defenders 202 or operators 102 in operational environments, the decision engine 110 needs to analyze candidate configurations within hours across local-level networks (hundreds of hosts) covering relevant and available cyber defenses (both proactive/reactive and across hosts/networks) in support of multiple concurrent missions. The models used by the decision engine 110 also need to accurately reflect real-world attacks and defense aspects in order to avoid making decisions using information that is stale, incomplete, or inappropriate. The decision engine 110 addresses these challenges via three design considerations. First, the decision engine leverages cloud technologies to scale to large problems by using an appropriate level of compute resources. Second, the anytime properties of GA search enable the decision engine 110 to quickly arrive at a good-enough answer that operators 102 can work with immediately, while the system continues to look for a globally optimal candidate configuration. Third, the decision engine 110 leverages human intuition and experience through a UI that guides search convergence to higher quality solutions faster.

Figure 9:
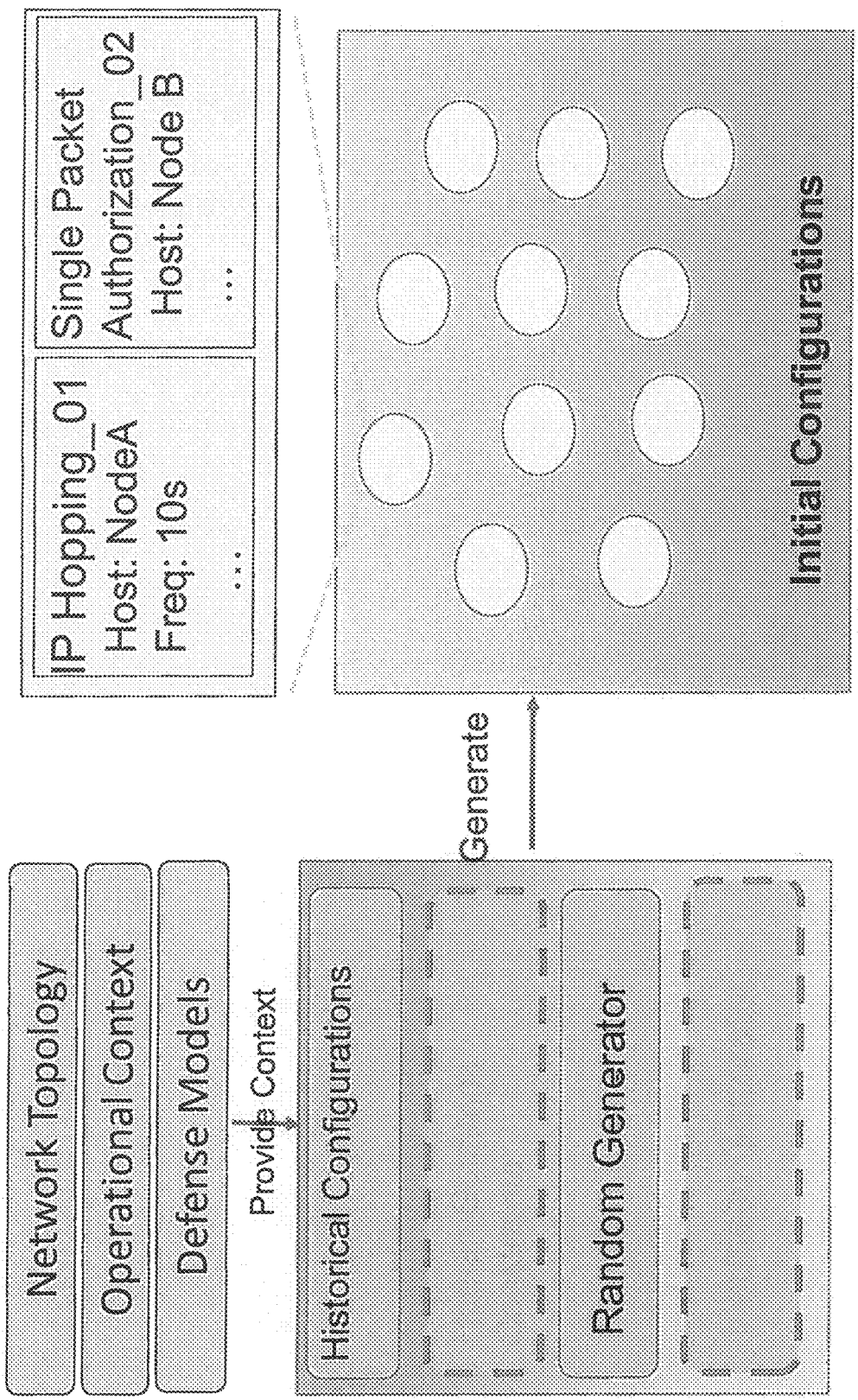
FIG. 9 is a block diagram of generating initial configurations.

Referring now to FIG. 9, the decision engine 110 initially generates initial configurations from the network topology, the defense models being used in view of the operational context of the environment. Historical configurations and other knowledge and constraints are taken into consideration as the initial configurations are generated. This is done through a knowledge base where the user can provide a set of defense configurations to try first, based on user intuition or what has worked in the past. The search process will use these as a starting point and can converge upon solutions faster, if the assumptions and user intuition were still valid in the current context. If not, the search will progress to other solutions.

Figure 10:
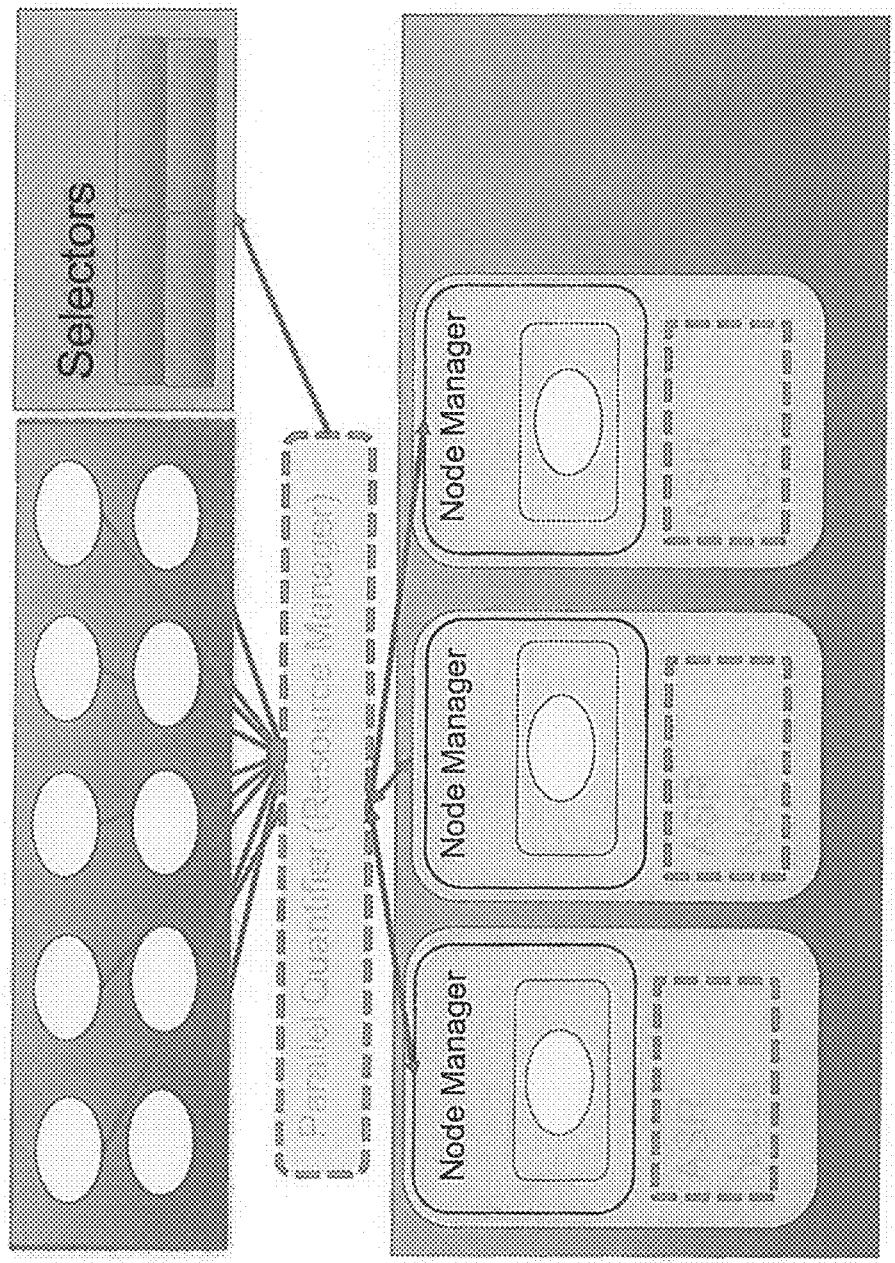
FIG. 10 is a block diagram of quantifying configurations.

Referring now to FIG. 10, the initial configurations are fed to the parallelized reasoning framework 114 where ASR is used to score the configurations and to quantify the configuration.

Figure 11:
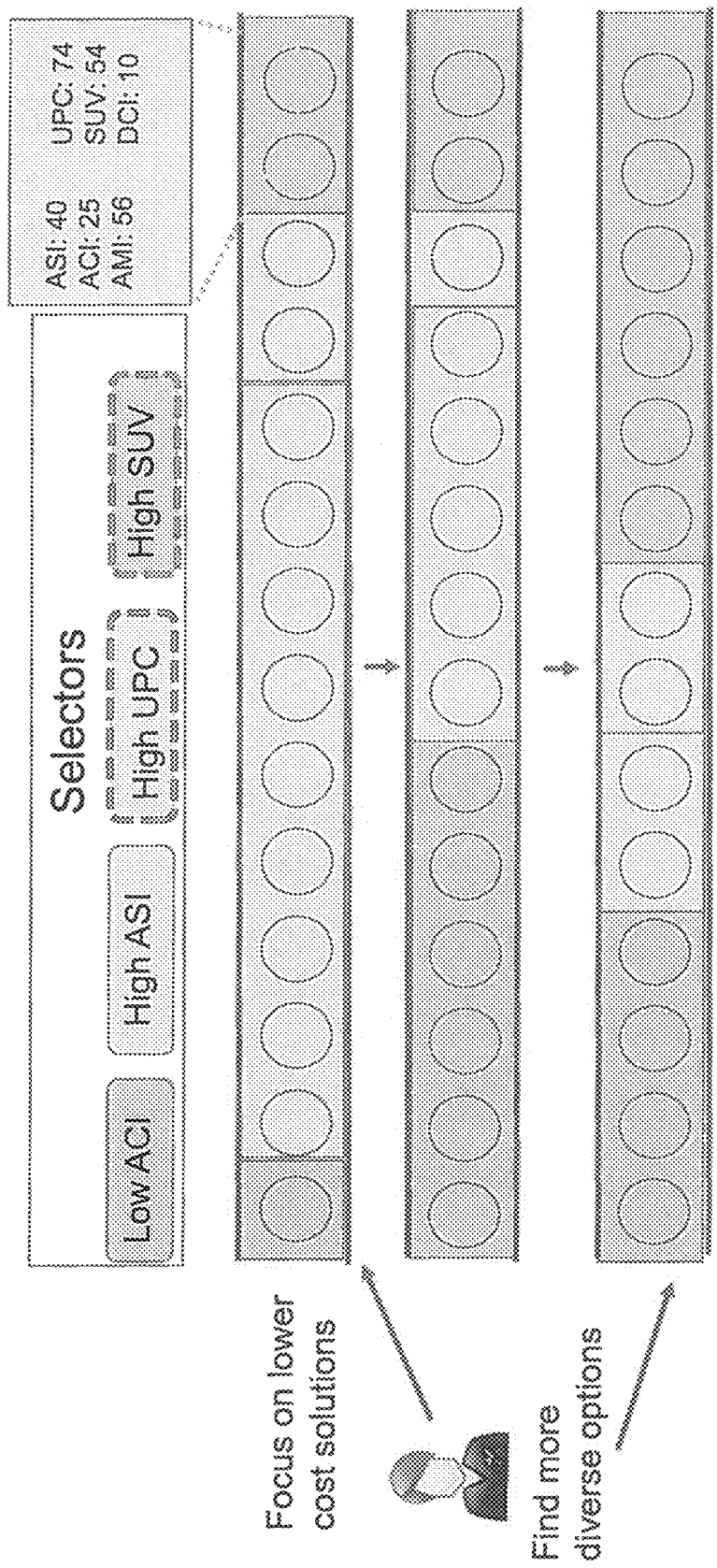
FIG. 11 is a diagram of a winning subset of configurations.

Referring now to FIG. 11, a winning subset of configurations are selected by a user and deployed as the initial set of configurations for defense of the network.

Figure 12:
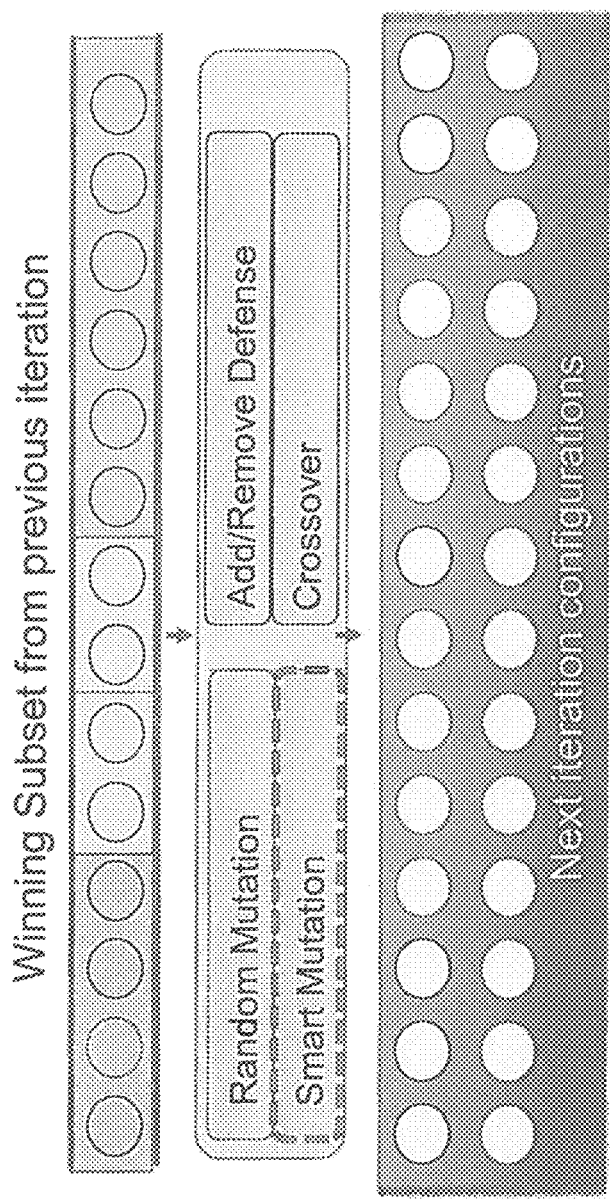
FIG. 12 is a diagram of generating new configurations.

Referring now to FIG. 12, the decision engine 110 continues to generate new configurations in view of changing environment and threats and as directed by a user. The decision engine 110 uses available information from defense models and how parameters influence metrics and takes portions of the two winning configurations and merge them to form new configurations and will add or remove defense instances from the configuration. A user 102 can always request the current best solution and the decision engine 110 will inform the user when an interesting solution has been found. A viable solution is one where the metrics meet pre-defined acceptable thresholds which will also be provided to a user.

Figure 13:
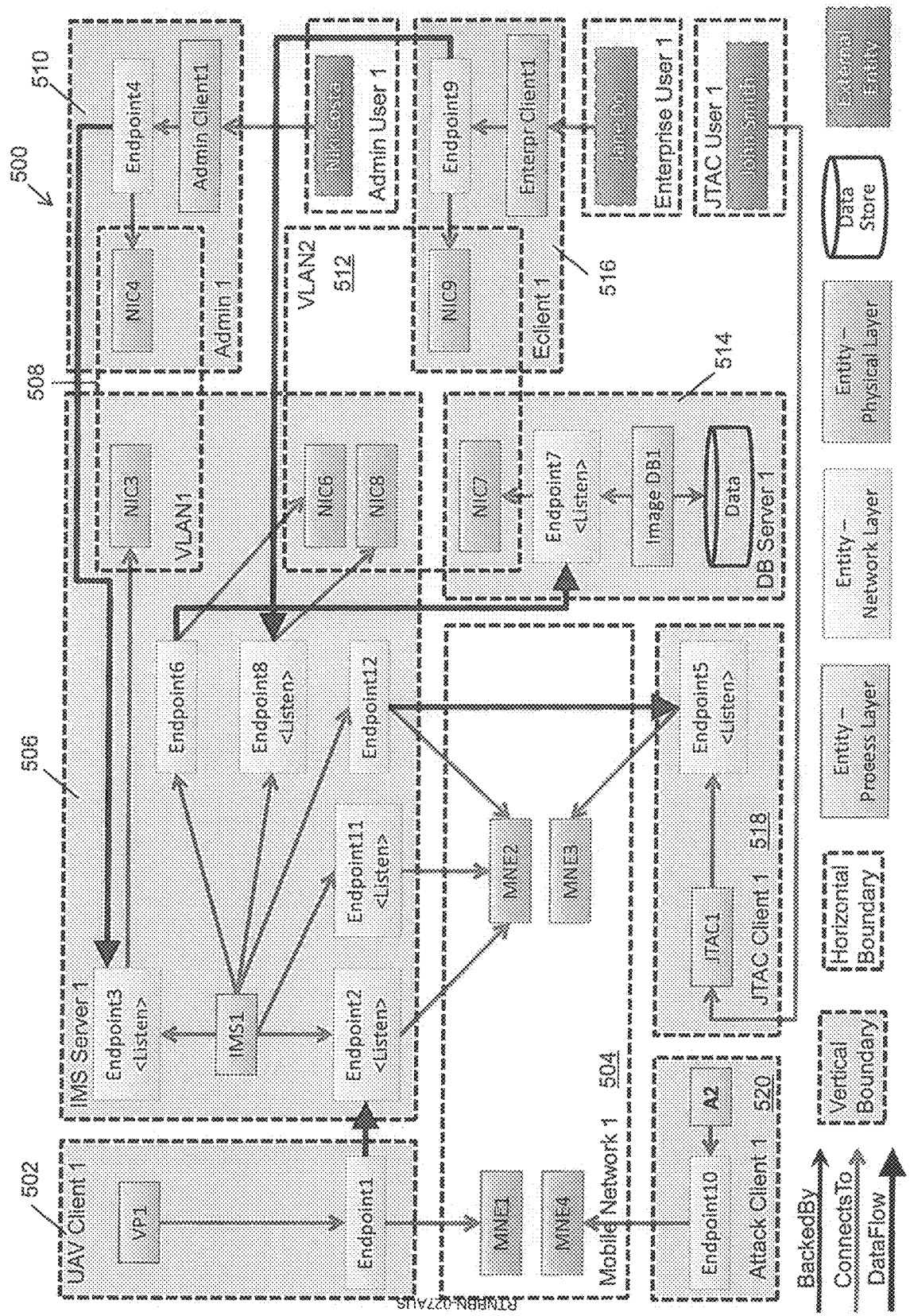
FIG. 13 is a block diagram of an example network environment being analyzed by the decision engine.

Referring now to FIG. 13, a block diagram of a typical network environment 500 being analyzed by the decision engine 110 is shown. The network 500 includes a UAV client 502 connected to a mobile network 504 and a IMS server 506. Also connected to IMS server 506 using VLAN 508 is admin client 510. IMS server 506 is also connected to VLAN 512 which is connected to DB Server 514 and to Enterprise client 516. Also shown is JTAC client 518 which is connected to IMS server 506 using mobile network 504. An attack client 520 is also shown which can introduce unwanted results into the network environment 500. The attacker operating at the Attack Client 520 has goals they want to achieve on the network, namely causing a Denial of Service (DoS) on the IME server 506 or an Elevation of Privilege effect on the Database Server 514. The attack steps that the attacker can use to achieve these effects involve sniffing traffic going across these links, probing for information, fingerprinting the operating systems, sending a TCP flood to disrupt a service, or taking over servers when a defect is found. The black dataflow links (such as the arrow between Endpoint4 in 510 and Endpoint 3 in 506) represent the data flows that have throughput and latency requirements in order for the mission to be considered successful.

Figure 14:
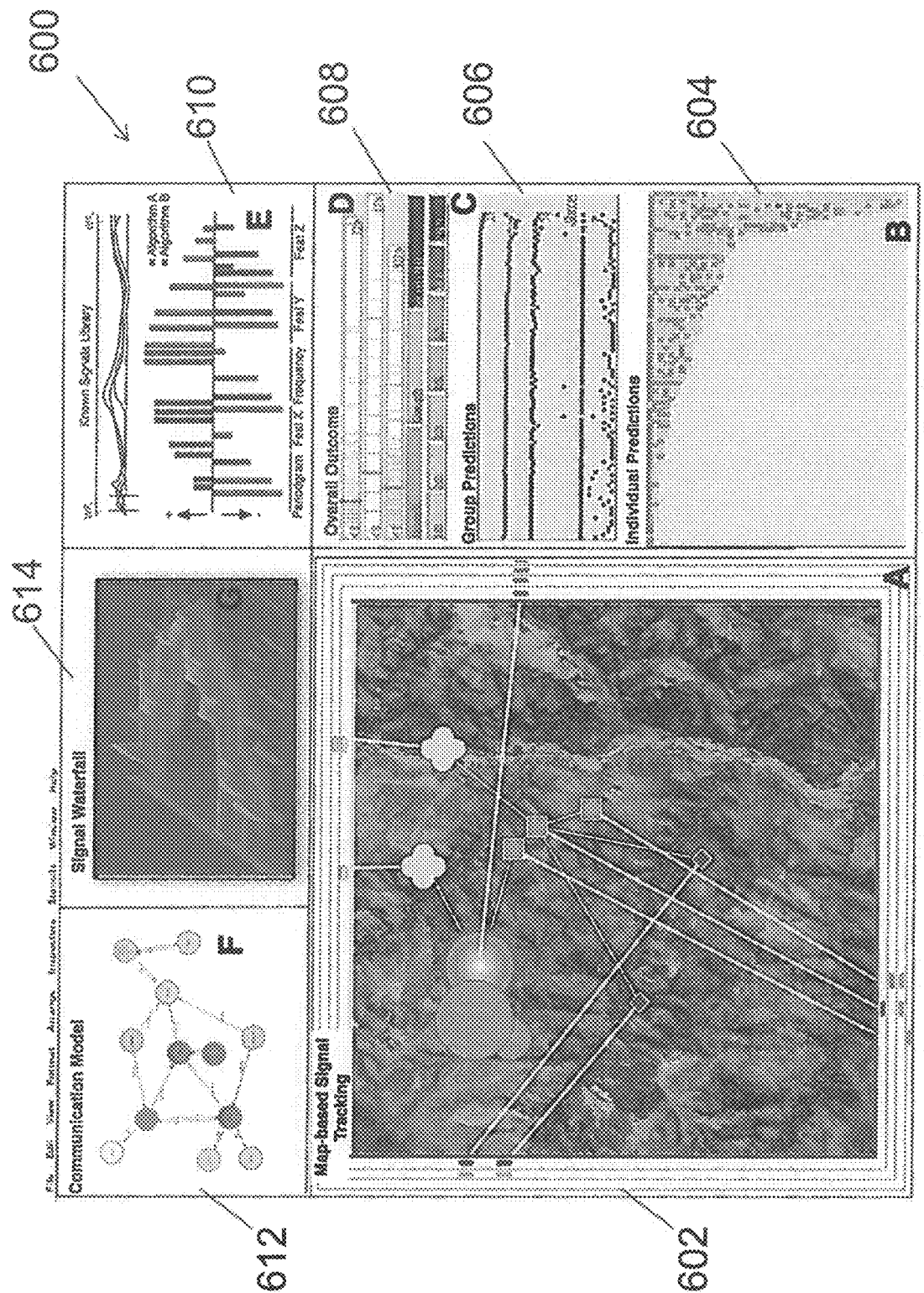
FIG. 14 shows a conceptual interface for EW/Cognitive radio.

Referring now to FIG. 14, a main task for a user interface 600 is to present a toolkit for an operator or user to identify the relative merits of alternative communication profiles in terms of temporal, spatial, and communications effectiveness. The interface 600 is an interconnected suite of components that are designed to enhance operator situation awareness, action selection and action effect comprehension. The interface 600 provides the operator with an external representation of the network environment that enhances understanding and decision-making with less cognitive effort than conventional displays. Effective external representations of complex environments are created by representing the semantics of the underlying data rather than measurements of the data itself. This removes the operator's mental burden of maintaining a complex model of an environment and replaces it with a direct perception task. The construction and interactions amongst the interface components also encode key environment, performance, and uncertainty information that can be readily interpreted by the operator. The interactions between components are effectively used to show correlated behavior between environmental or performance-related signals, but also reliably indicated when predicted correlated behaviors fail to materialize.

Figure 15:
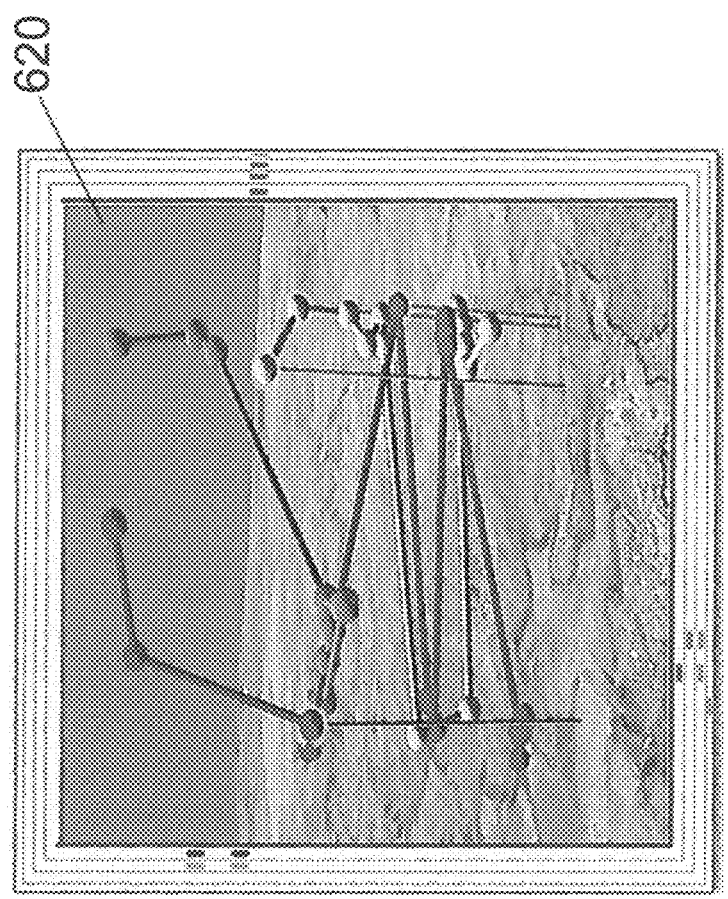
FIG. 15 shows communication events over time (in the vertical axis)

The interface 600 as shown in FIG. 14 includes three main sets of interactively connected components: (a) Map-based signal tracking, localization, and environmental effects (window 602); (b) Explanatory Visualizations of the operating environment (window 614, window 612); and (c) Visualizations and Tools for understanding, comparing, and manipulating the behavior of learning and reasoning algorithms used in the system (window 604, window 606, window 608 and window 610). The Map-based signal tracking visualization component shows geo-located track movements and activity over time. The purpose of the display is to show a large, filterable set of emitters and the interactions between them and different mitigations (i.e., jammers) taken to counter them. The display also provides a convenient starting point for understanding the global situation, and for identifying and drilling down into more select. The outer rings of the map view show signal activity over time, where the inboard edge is most recent and the outboard edge the most distant past. This introduces a temporal aspect of the movement and periodicity of communication events. The map view can be views top-down (as in FIG. 14) or tilted to show a vertical dimension that can encode signal intensity, power, or other features of emitters. FIG. 15 shows a tilted, three-dimensional view 620 encoding spatio-temporal signal relationships. Time is the vertical dimension, color identifies the signal, and the connections show the communications link.

The Explanatory Visualization components (window 614, window 612) are a set of views of the geo-located data that are constructed to better answer the specific, commonly-asked questions of the operator. Examples of Explanatory Visualization components are graph-like depictions of network topology or communication networks and the commonly used waterfall view for wireless network operations. These are tools that operators are familiar with and provide a means of drilling down into data with other components.

Visualizations and tools for understanding and manipulating learning and reasoning algorithms are specialized displays (window 604, window 606, window 608 and window 610) that convey the state of the learning components of the system and can be very useful in conveying the capabilities of the system in the given environment. The historical performance of a group of classifiers, combined with a visual breakout of the signal aspects used by the classifier to make a decision can provide the operator with information critical to his/her understanding of the operation of the classifier and the probable outcome of different signal mitigations. In FIG. 14, window (section) 604 shows the performance of individual classifiers on a current problem. This component shows the operator show common or specialized the problem is based on the number of individual solutions that perform well on it. If only one or a few classifiers perform well, the problem is more difficult and may require additional resources or should be directed to exploit the currently high-performing solutions by expanding on their behavior more in subsequent generations. If virtually all of the classifiers perform well, then the problem is either over-resourced, or is very simple to solve which indicates that the operator should direct the GA to explore alternative solutions by including more randomness. Window (section) 606 aggregates the performance of the individual classifiers into groups according to various criteria such as threat type or resource usage. Comparing different groups of classifiers on the given problem shows a broad brush effectiveness of alternative strategies capable of solving the problem. Window (section) 608 provides information into the historical performance of group strategies on problems in the past. This links the user into a wider experience base and permits subtle distinctions between strategies to be made.

Window (section) 610 shows a tool for comparing different solutions to the current problem, that is called the jellyfish, because of the hemispherical shape of the top of the figure, and the tendril-like lines extending from the bottom of the figure. In the figure, the horizontal axis is divided into columns of features of the solutions being compared. The columns are sorted so that the most important features are in the middle, and the less important features are at the edges. The figure results in a Gaussian Normal curve-like arc when the importance of each feature is plotted for the solutions to be compared. Below the horizontal line is plotted the performance of the feature in the selected algorithm. The longer the bars the better the performance. The solutions under comparison are given different colors in the jellyfish, making it easy to see gaps and asymmetries in solution capabilities.

Interaction with the reasoning algorithms is enabled by our innovative ontology-supported query views and mechanisms. The resulting display concept is to portray objects and overlays on a map-view of the area of interest. Display elements will be shown as "semantic primitives" that are directly isomorphic to pertinent aspects of prediction and control, rather than relying on a human's mental calculations to fill the gaps. Each object is also directly linked both into the ontologies and into the relevant computational workflows. Thus, highlighting an object on the display will bring up a corresponding node in the ontology-supported search window. Relationships with other displayed objects automatically appear, making it easy for the operator to select relationships to explore or to de-clutter the display. These relationships will also be one of the key integration points with the computational algorithms.

Figure 16:
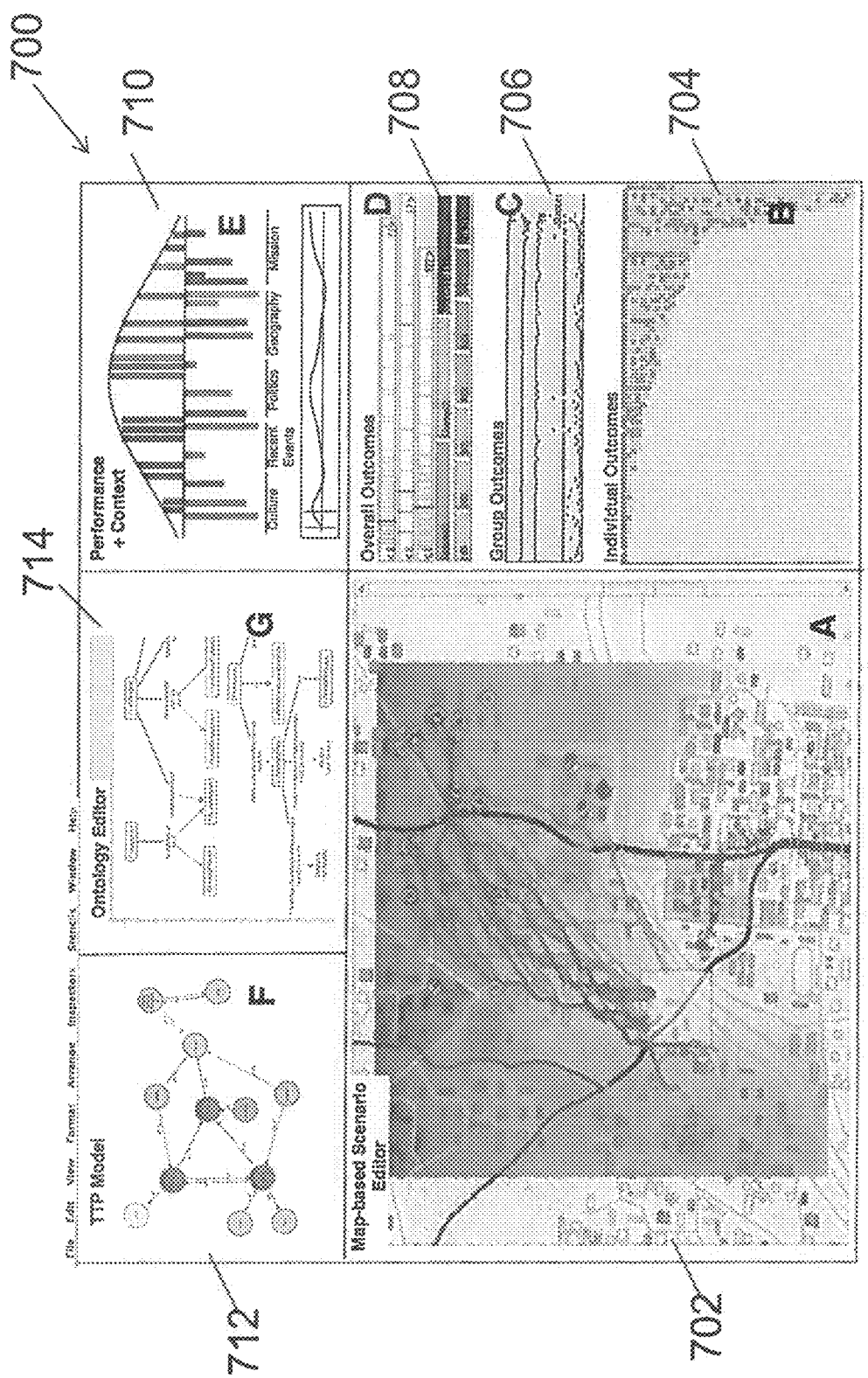
FIG. 16 shows a user interface to allow users to interact with the evidence and the reasoning framework.

Referring now to FIG. 16, a display 700 is shown with a user interface exemplar which uses a linked set of visualization components to include section (sometimes also referred to as a window) 702, section 704, section 706, section 708, section 710, section 712 and section 714. To illustrate how a user might interact with the evidence and reasoning algorithm's products, using the labeled sections in the display 700, the following example is provided. For example, the user operating in the real time mode will be able to visualize a family of TTPs inferred by the algorithms as shown in section 712 on the display 700. These TTPs then can be geospatially linked and overlaid on a map of the area of interest as in section 702. Analysts can also check the logic underlying the TTPs by viewing the right-hand column of the display which includes the results of a parallel swarm algorithm search going from a detailed survey of the number of possible outcomes investigated (section 704), to an aggregation of the hypothesized coverage of the available data based on the subset of outcomes that reached some set of a priori criteria (section 706).

As analysts operate in the discovery mode, they can interact with the visualization component shown in section 708. Here, the user sees an overall aggregation of several key factors that help to understand the probability distributions produced by, for example, the (hypothetical) causal discovery algorithm. These algorithm-centric tools allow users to recognize when multi-INT-sensed behavior is approaching a tipping point—such as an imminent ambush—or when it is simply generating clutter representing the populace's typical (but dynamic) behavior. Additional tools allow users to scan the parameter space of a system of models efficiently and to zero in on regions requiring more attention. The component shown to the user in section 710 is a unique "Performance+Context" presentation of the aggregate effects of the candidate activities in relation to the selected TTP model that is developed to assist analysts in understanding and manipulating the underlying reasoning algorithm. Analyst-users investigate many different scenarios within the same general context by manipulating the values and weights depicted in these components, depicted as red and green bars, showing their influence on the solutions generated by the model, which initiate a forward propagation forecast using the new data.

Users may change the structure of the underlying TTP models or the general representations of the area of interest by changing the underlying semantics used by the system. Such model modification is accomplished with either the threat model under investigation as shown in section 710 or with the visual ontology editor shown in section 714.

Figure 17:
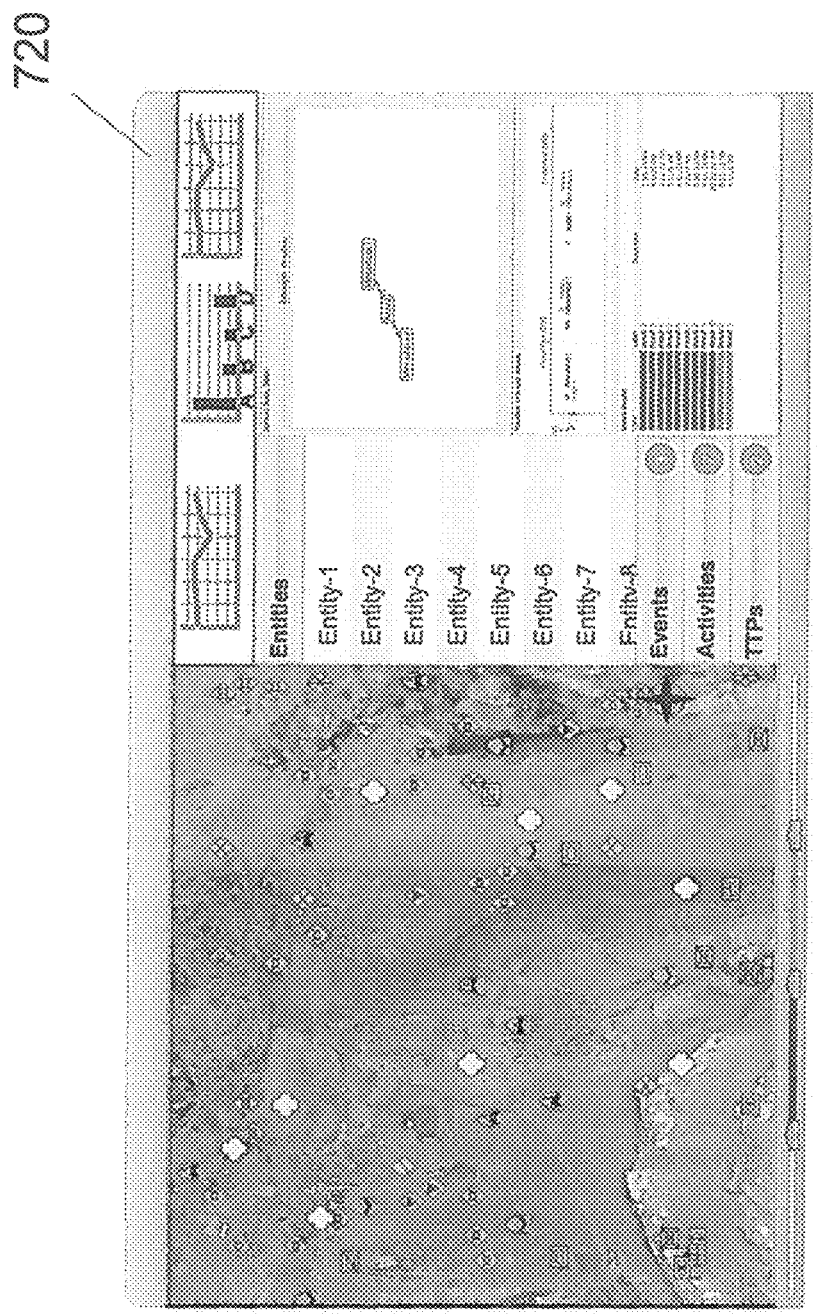
FIG. 17 shows an exploratory display with an interface showing dashboard, tracking at multiple layers, and user querying of live datasets.

Referring now to FIG. 17, a notional exemplar display 720 is depicted of other displays in the real-time, exploratory analysis mode, including: (i) a "dashboard" with an Indicator and Warning (I&W) display; and (ii) a probability "meter" that also shows multiple streams of data in a common frame of reference. In addition to the use of displays for primary information regarding the I&W task, we ensure that the user is able to ascertain uncertainty with respect to the presentation of objects and relationships or perhaps the wider dimension of overall reliability of the evidence.

The left side of the display 720 shows a geo-spatial map of the area of interest annotated with detected entities and locations of events. Alternatively, this could be a network topology map with the activities of users and defenses annotated on the network graph. Activity traces and connected TTPs can also be overlaid on the map if selected by the user from the list to the right of the map area. The top right shows three graphs in a "dashboard" that indicate the overall situation status in terms of the numbers of unclassified signals, the top four TTPs based on the evidence, and the rates of intelligence streaming into the system from different sources. With exploratory analysis, the user's task is to derive patterns from the data that indicate either known TTPs, or that are evidence of new/evolving TTPs. To do this, the operator can look at the number and locations of existing and newly acquired entities and from that information can begin to infer new events, activities, and TTPs. The node and link graph on the right is an interactive, ontology-supported querying tool that is used to investigate relationships between entities, events, and activities.

As discussed above, the disclosure teaches a technique to influence the behavior of an adaptive system in two ways: (a) leading the adaptive system to good solutions by inserting individuals into the population of consideration and modifying evaluation function to favor exploration or refinement of existing solutions; and (b) removing search space from consideration by restricting the proposed solutions to avoid having infeasible, impractical or disallowed solutions from consideration and ensuring the solutions contain aspects that are required by the operator, the operational context, or the organization.

Figure 18:
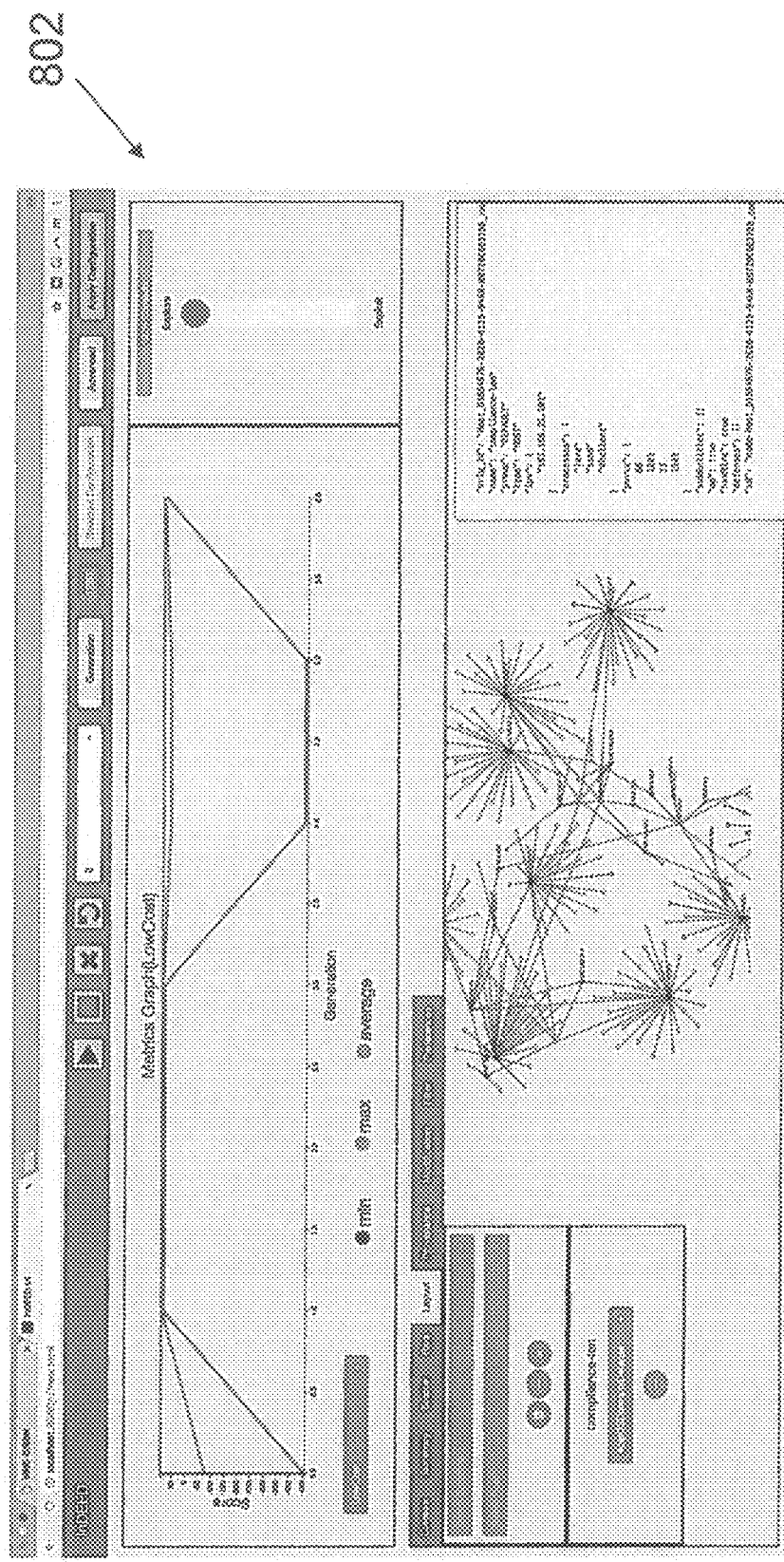
FIG. 18 shows a display to assess adaptive system performance.

Referring now to FIG. 18, an operator can observe display 802 and grasp an understanding of the state of the adaptive system, capture an overall assessment and explore different solutions and how they compare.

Figure 19:
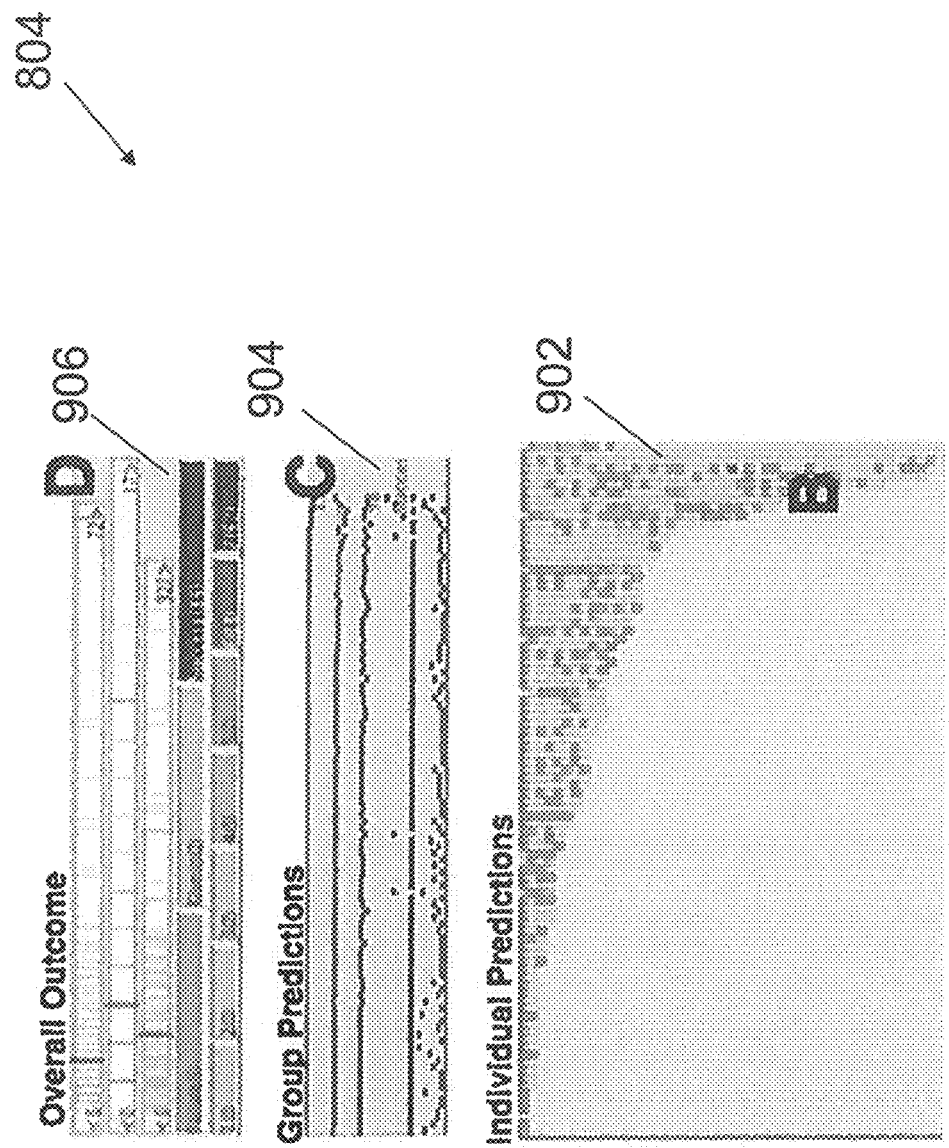
FIG. 19 shows a display to visualize environment modeling.

Referring now to FIG. 19, an operator can observe display 804 and obtain visual feedback on performance of signal classification. Feedback is provided on individual model classifications as provided in section 902, classifications according to threat type as provided in section 904 and overall classifier performance over time as provided in section 906. The latter is used to assist operator in determining what makes successful classifiers. Visualizations help operators understand if the adaptation algorithm is stuck in a local minima or does not have the criterion to distinguish better solutions.

Figure 20:
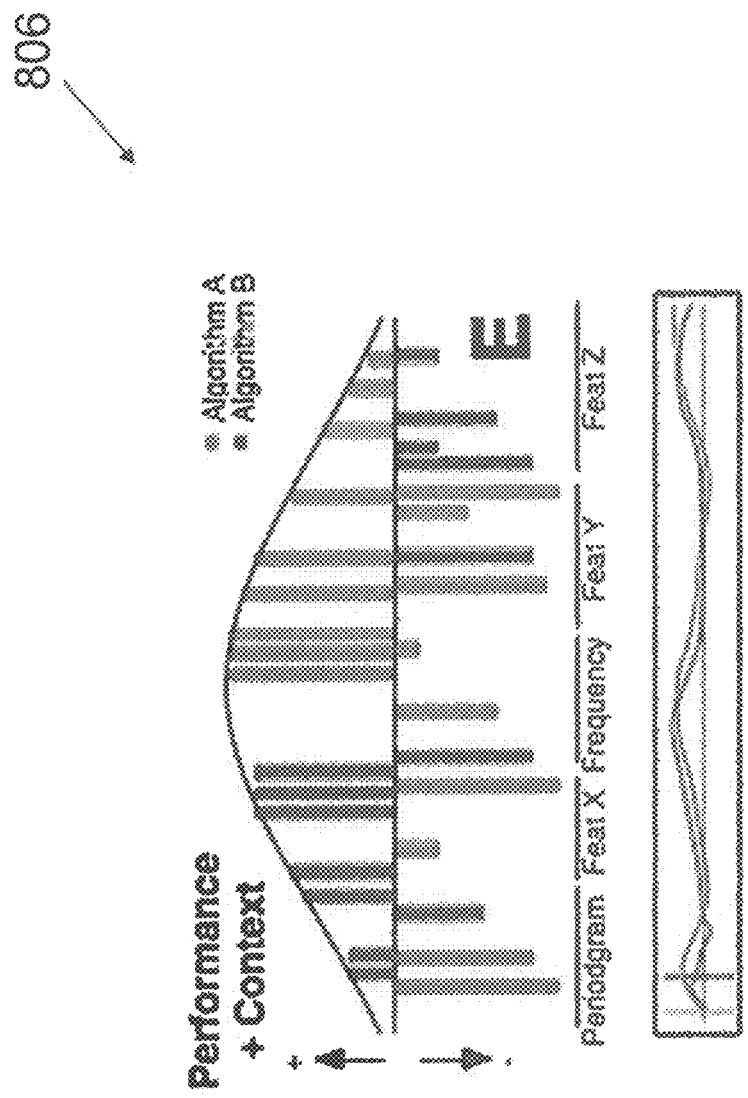
FIG. 20 shows a display to understand performance.

Referring now to FIG. 20, an operator can observe display 806 where this visualization shows how different classification algorithms perform with respect to an evaluation function. The lower portion (line chart) of display 806 shows performance of classifiers over time. The upper portions of display 806 shows importance of each feature to the given classifier where principal components analysis is performed over the population and individual solutions to determine the importance of each feature in the solution. Multiple classifiers can be shown in different colors for comparison.

Figure 21:
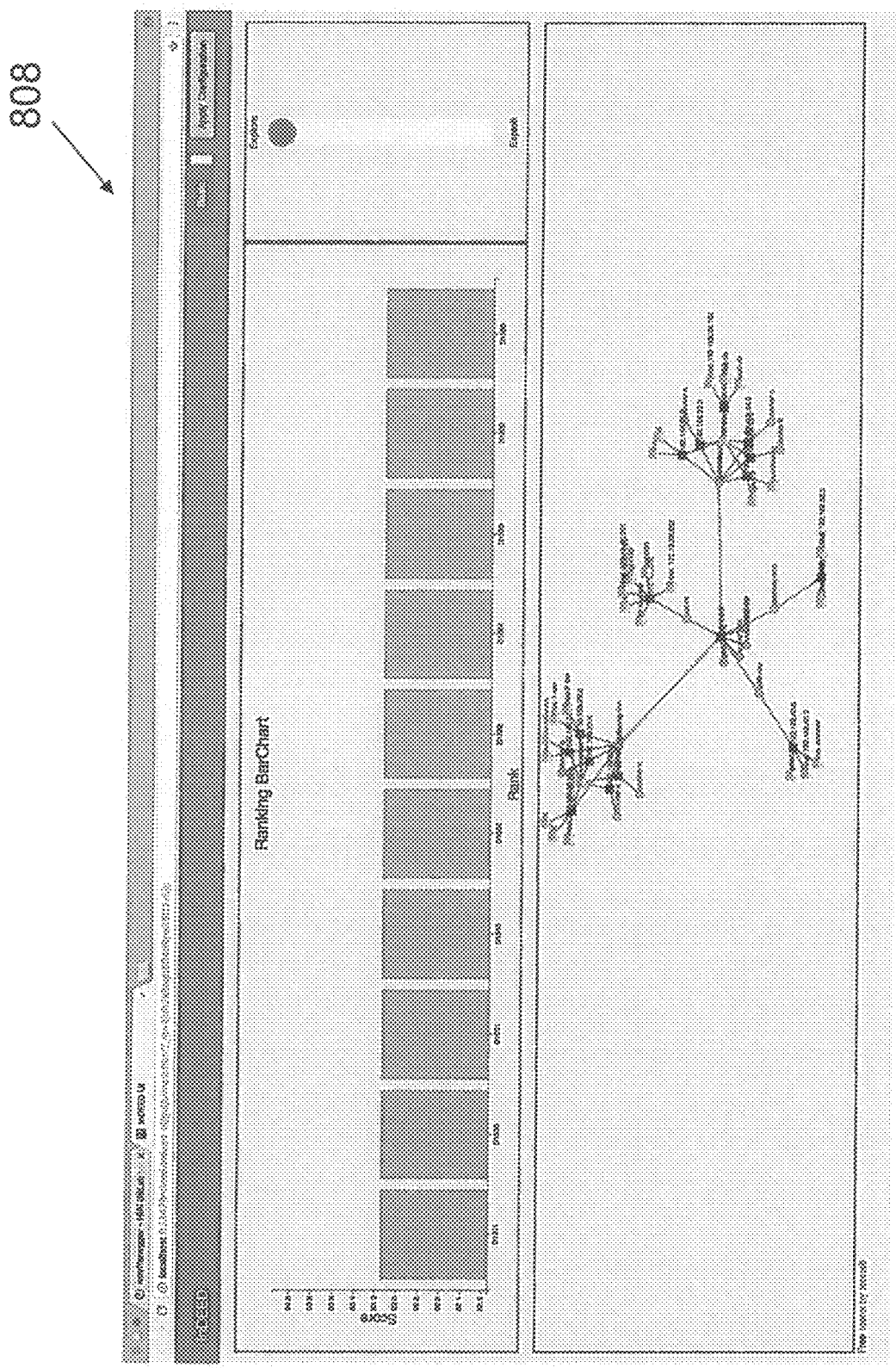
FIG. 21 shows a basic interface display.

Referring now to FIG. 21, display 808 shows basic interface which shows (a) a bar chart showing performance of genetic individuals, (b) network map showing network topology and defense and machine characteristics, and (c) slider to vary GA search from exploratory to exploitive.

Figure 22:
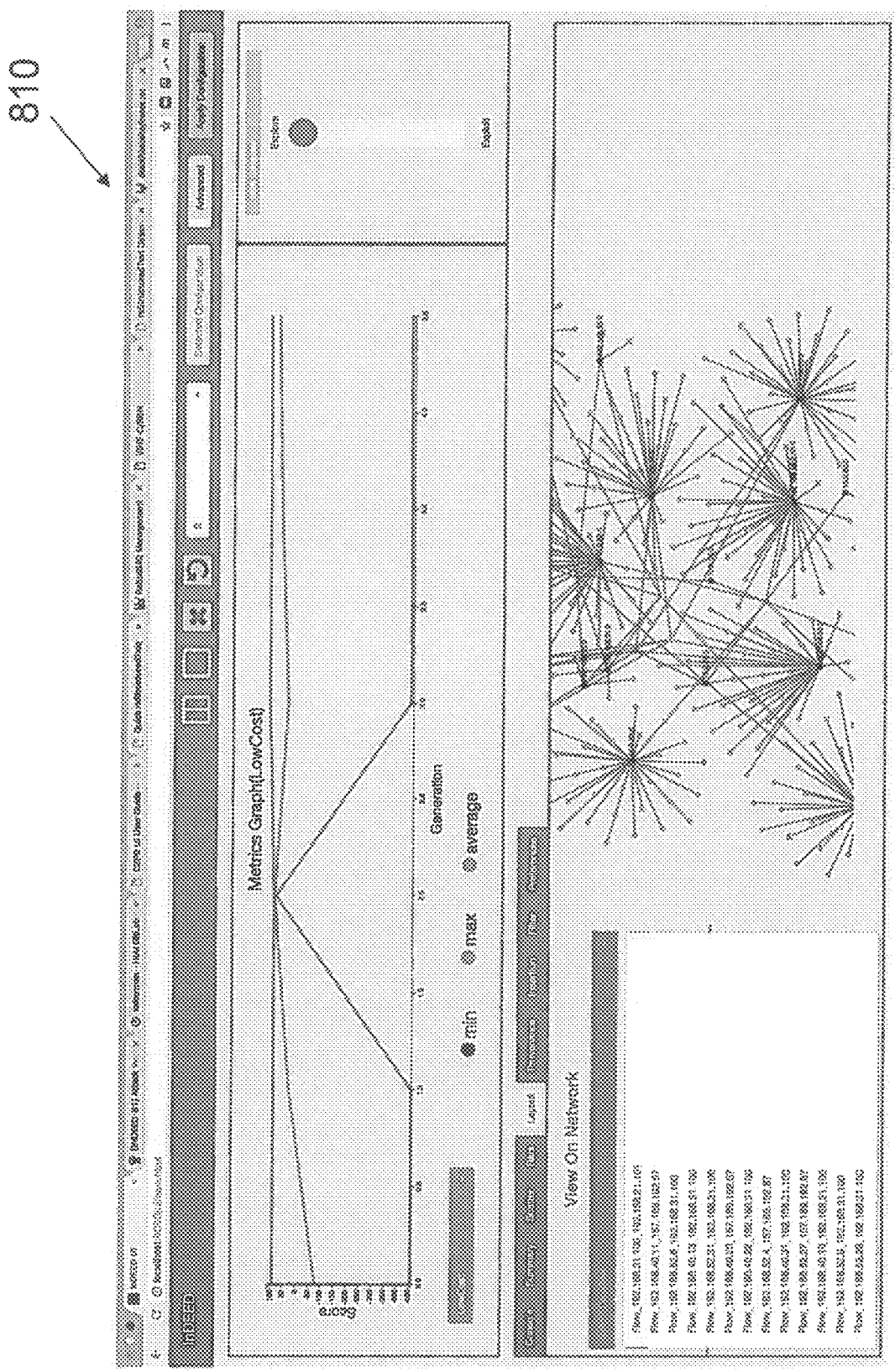
FIG. 22 shows an advance interface display.

Referring now to FIG. 22, display 810 shows an advanced interface which shows more tabs along the bottom pane that enables the operator to look at: (a) console showing logging messages from the GA processor and from the interface, (b) summary of the top defense configurations, (c) scatterplot showing relationship on multiple axes (usually cost vs security) of proposed configurations, (d) bar plot showing characteristics (usually cost or security) of proposed configurations, (e) layout showing network topology and all data flows, (f) provenance showing the genealogy of the proposed configurations, (g) insertion allows operator to insert a new defense configuration into the GA population to direct the search towards that and similar individuals, (h) filter allows the operator to modify the rules under which new defense configurations are constructed by requiring or preventing particular defense configurations, and (i) preferences where user preferences can be modified.

Figure 23:
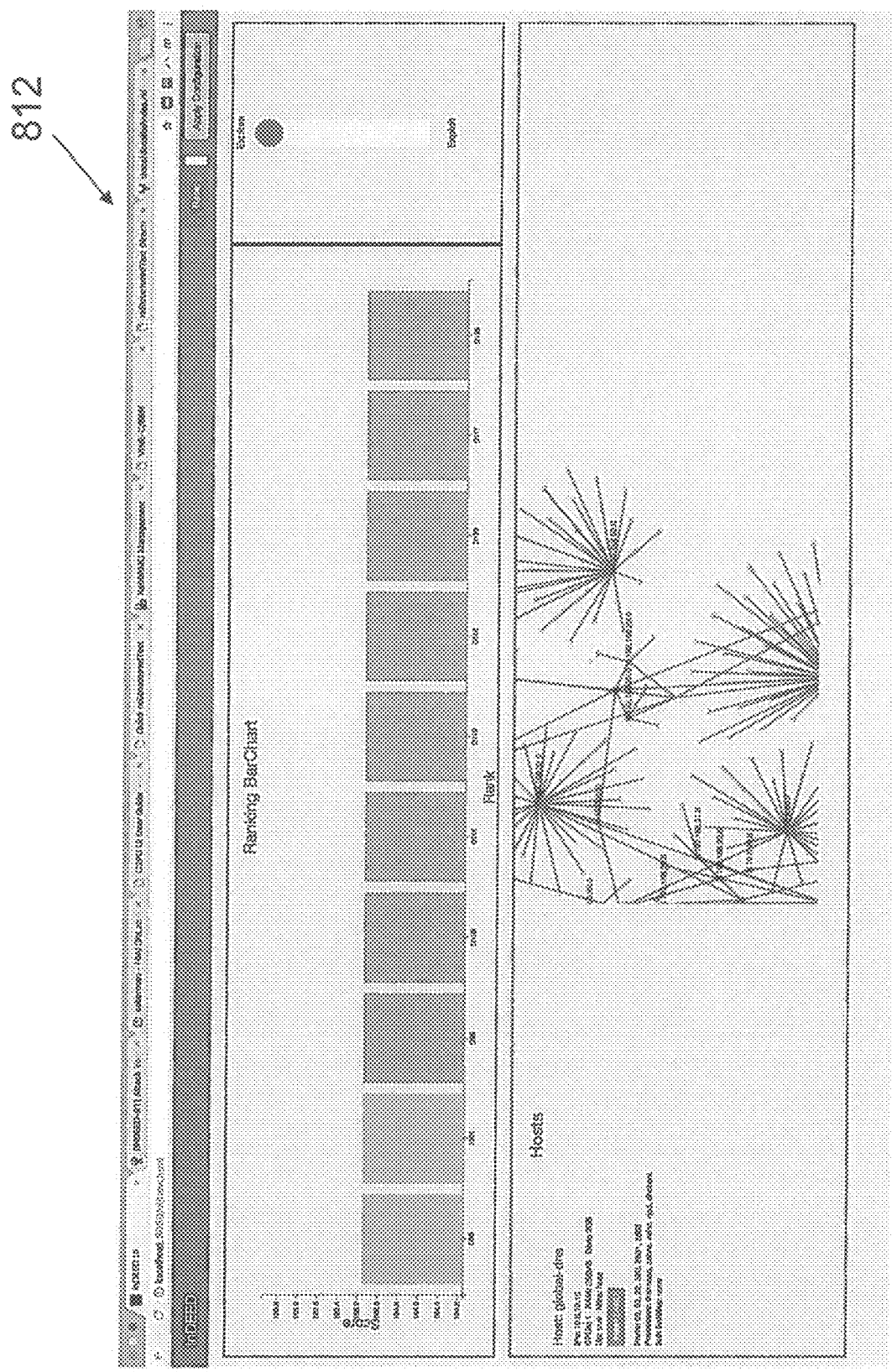
FIG. 23 shows a display to perform basic comparison.

Referring now to FIG. 23, display 812 shows basic comparison which allows two individuals to be selected and their similarities and differences shown on the network map. Green shows common elements, red shows elements in configuration 1 and not in configuration 2, and blue shows elements in configuration 2 but not in configuration 1. The information on the left shows specific information about hosts on the network, including what processes are running and the options for installing and running new capabilities or defenses.

Figure 24:
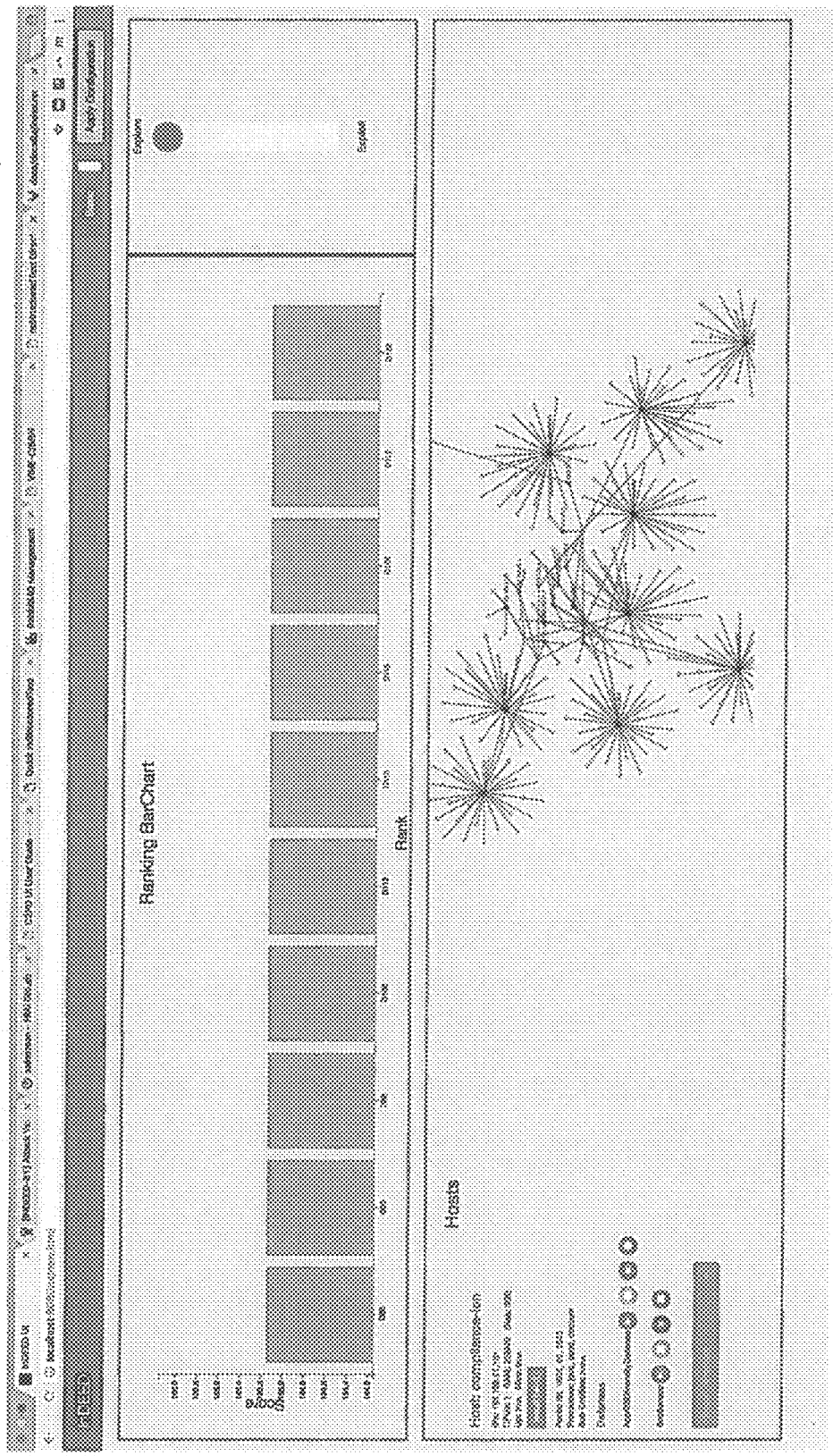
FIG. 24 shows a deploying and monitoring display.

Referring now to FIG. 24, display 814 shows the ability to install, monitor, and control elements on the network topology. In this example, the SAWD agent (a software process that can install and control network sensors and defenses based on the local command and control) can be installed, and there are two defenses running in this configuration, AppOSDiversityDefense and BroSensor. These can be stopped and restarted or can have specific methods executed on them by clicking on the blue circle with the white box.

Figure 25:
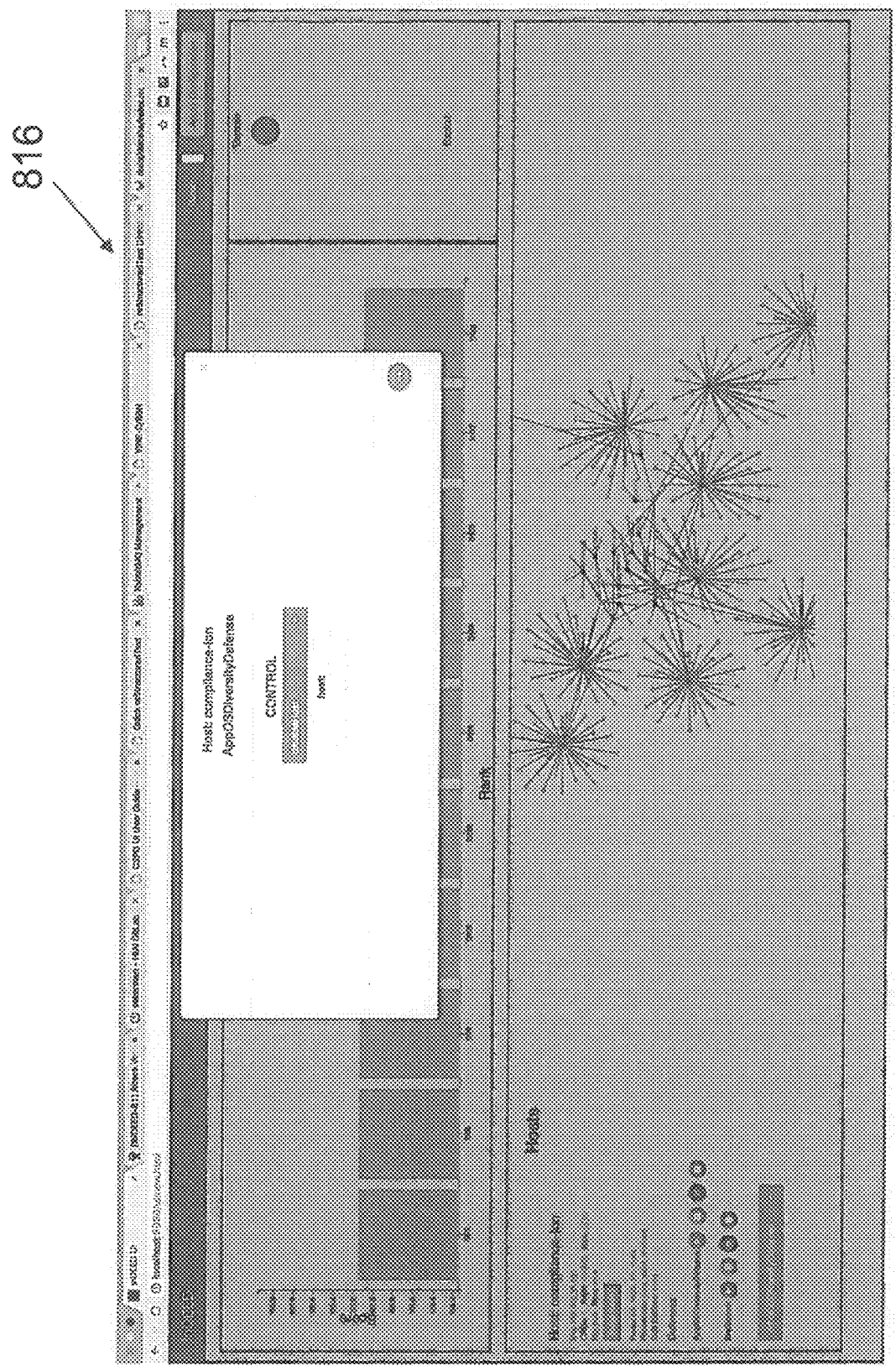
FIG. 25 shows a control method window.

Referring now to FIG. 25, display 816 shows a control method window to show the control dialog that appears when the blue circle in the FIG. 24 is clicked. The information contained in this dialog comes from the defense ontology.

Figure 26:
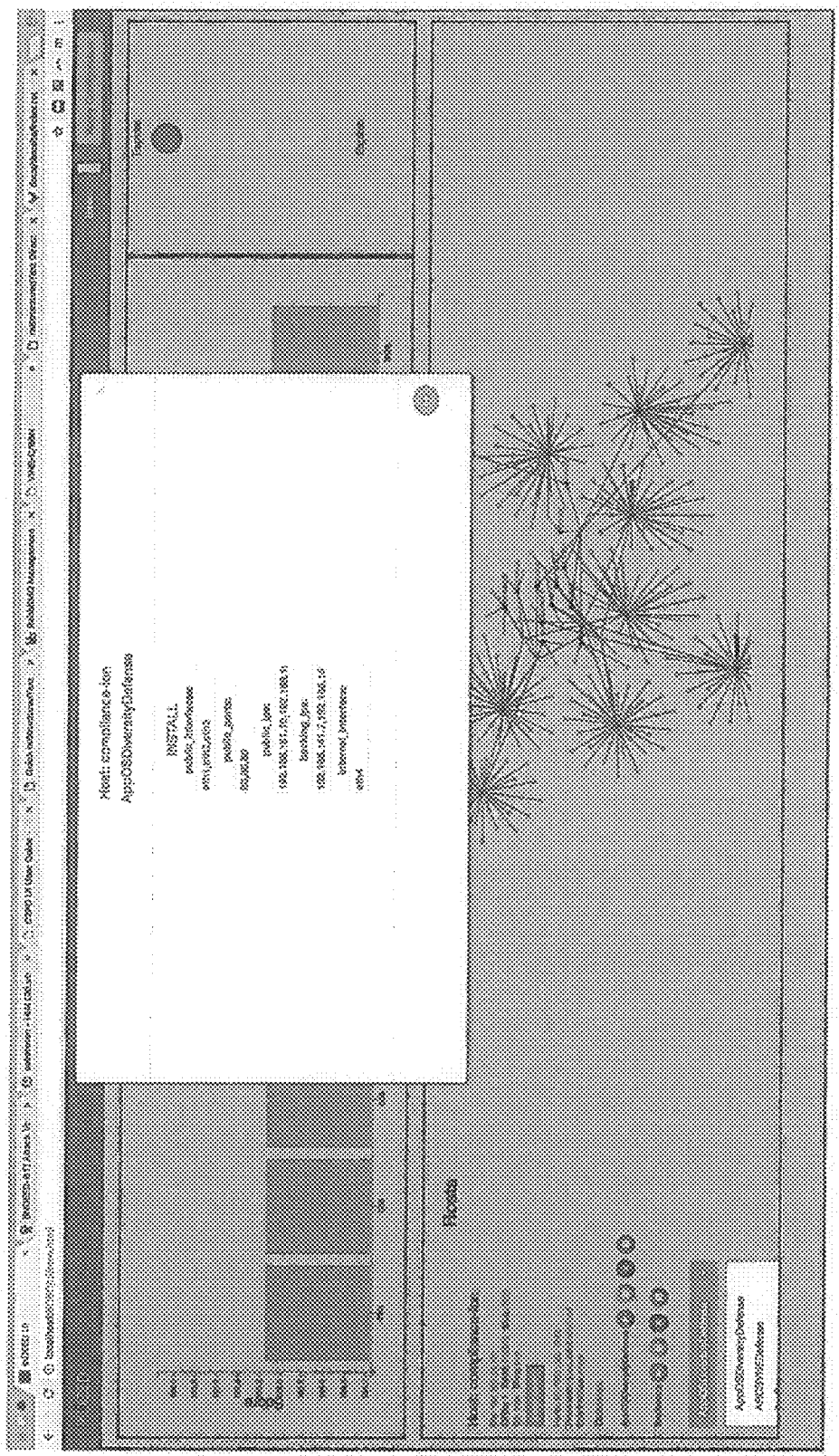
FIG. 26 shows an installation window.

Referring now to FIG. 26, display 818 shows an installation window to show an installation dialog where new sensors and defenses can be installed, and the installation parameters read from the ontology are displayed to the operator.

Figure 27:
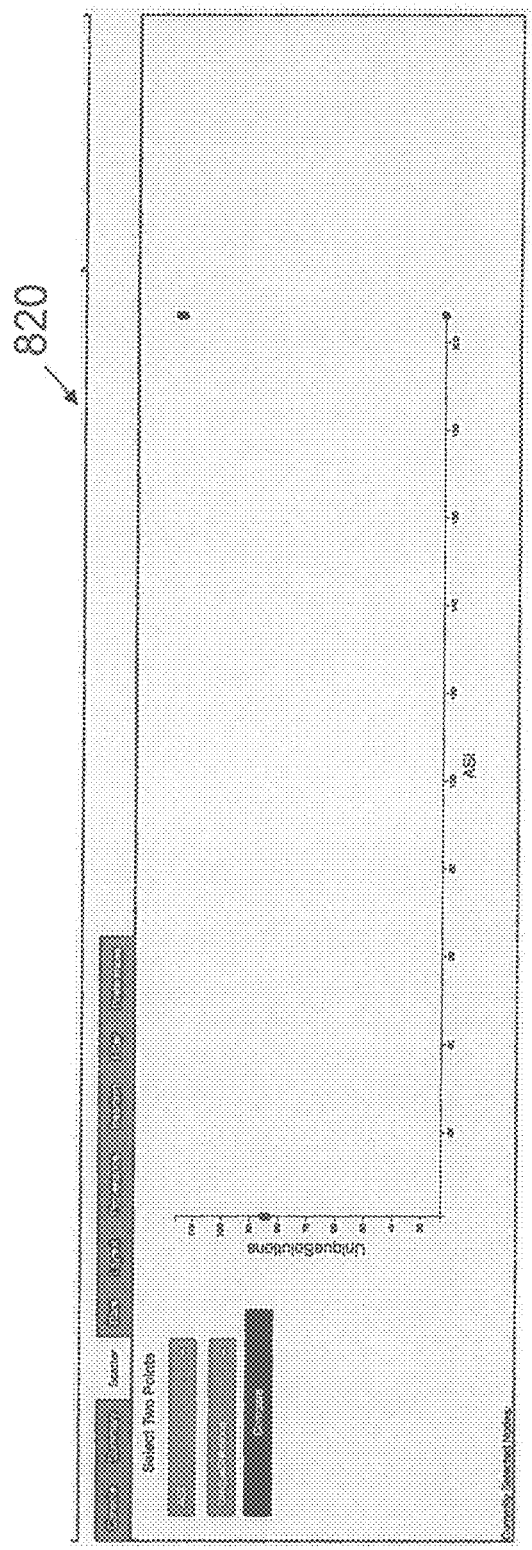
FIG. 27 shows a view of a scatterplot.

Referring now to FIG. 27, display 820 shows a view of a scatterplot as referenced with the description of the advanced interface of FIG. 22.

Figure 28:
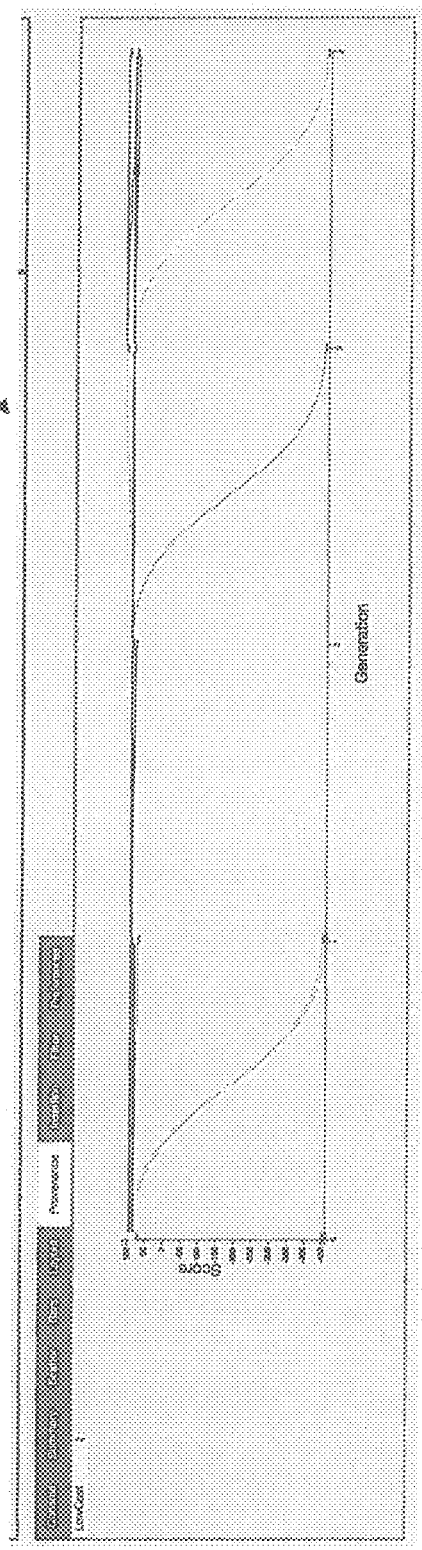
FIG. 28 shows a view of a provenance.

Referring now to FIG. 28, display 822 shows a view of a provenance as referenced with the description of the advanced interface of FIG. 22.

Figure 29:
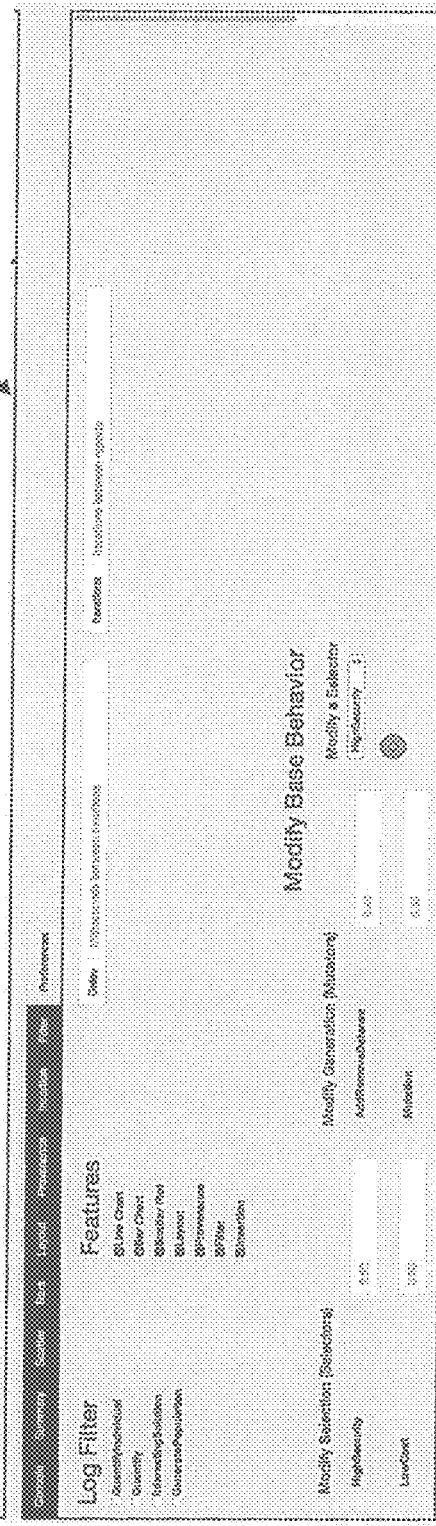
FIG. 29 shows a view of operator preferences.

Referring now to FIG. 29, display 824 shows a view of operator preferences as referenced with the description of the advanced interface of FIG. 22.

Figure 30:
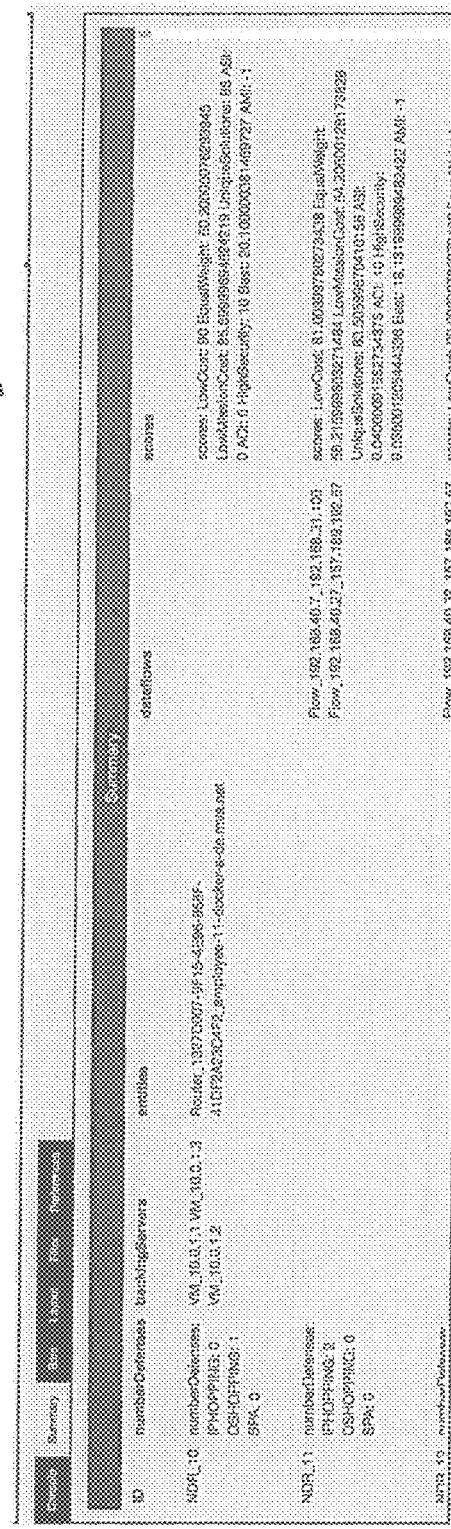
FIG. 30 shows a view of configuration summaries.

Referring now to FIG. 30, display 826 shows a view of configuration summaries as referenced with the description of the advanced interface of FIG. 22.

Figure 31:
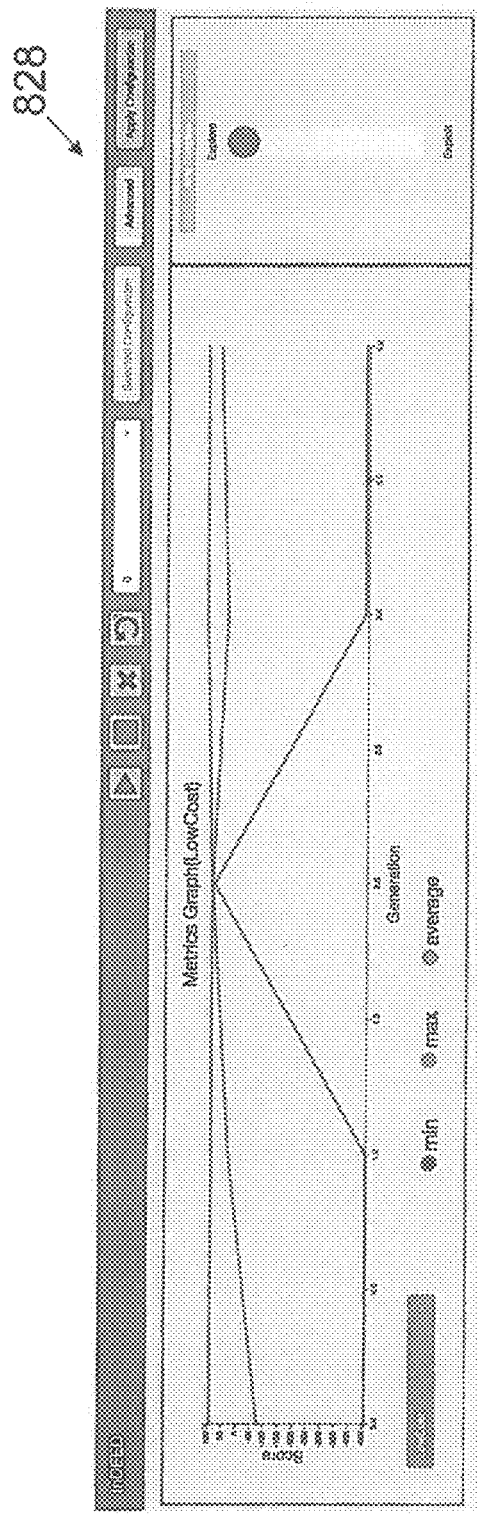
FIG. 31 shows a view of population history line chart.

Referring now to FIG. 31, display 828 shows a view of a population minimum, maximum and average fitness over time history line chart.

Figure 32:
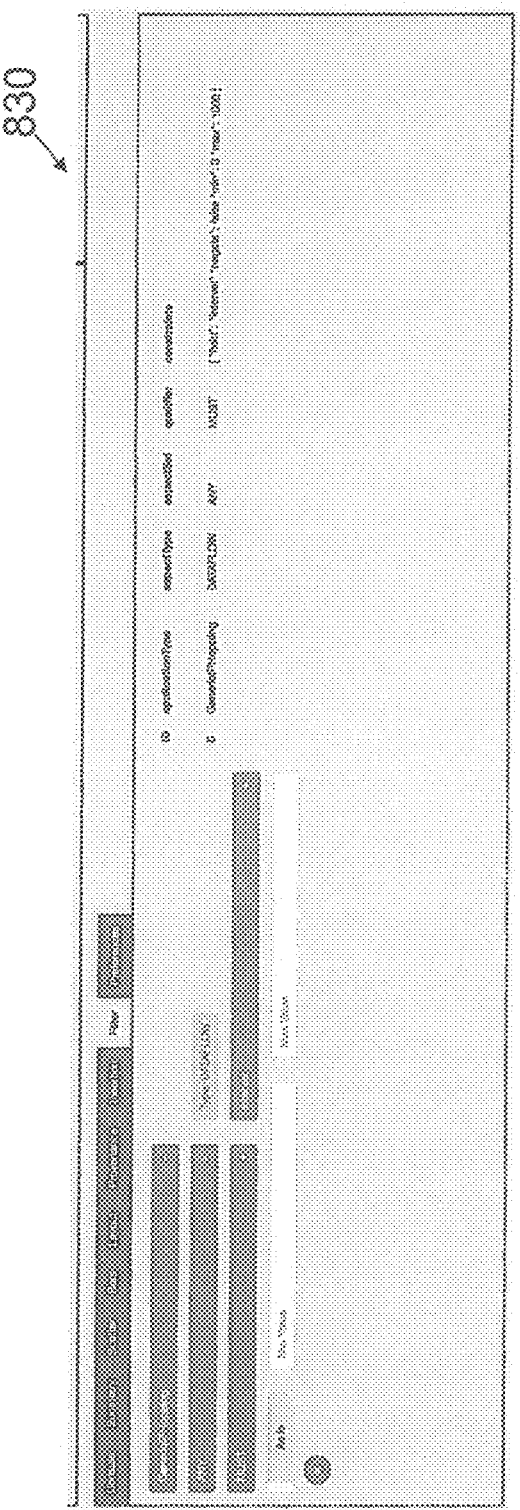
FIG. 32 shows a view of configuration constraints.

Referring now to FIG. 32, display 830 shows a view of configuration constraints by selecting a filter tab as referenced with the description of the advanced interface of FIG. 22.

Figure 33:
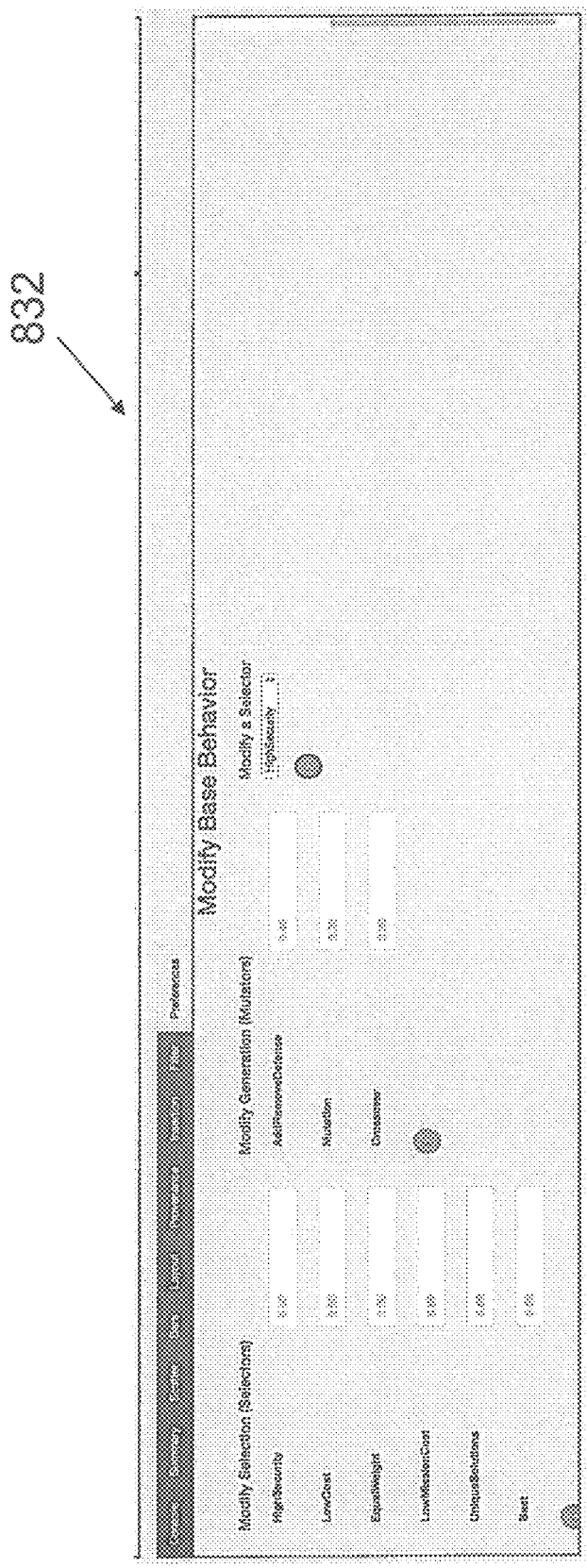
FIG. 33 shows a view of function modification.

Referring now to FIG. 33, display 832 shows a view of function modification by selection a preference tab as referenced with the description of the advanced interface of FIG. 22.

It should now be appreciated, the disclosure provides concepts for a decision engine that intelligently searches for optimal cyber defense configurations in a way that leads to continuously improving solutions and to use a multi-dimensional heuristic search across security, cost, or mission attributes to quantify the attack surface of a system.

It should also be appreciated, the disclosure teaches an integrated decision engine which provides: (a) Anytime Search to include: Generate Candidate Configurations, Evaluate Candidates using ASR Algorithms and Select best candidates for the next round; (b) Parallelized Reasoning Framework to include: Run ASR algorithms on one configuration and Collect resulting metric scores; and (c) User Interface to include Allow user to provide insights and guidance and Allow user to understand and influence the search. The disclosure also provides concepts for an user interface that presents meaningful choices between multiple cyber defense configuration to operators and incorporates their feedback to improve the suggested solutions and leverages human insight to guide the search across potential cyber defense configurations and to explore spaces where defenses are needed the most or most applicable. Search space must have structure, gradients to climb in order for a genetic algorithm to be effective. ASR metrics combined with new metrics provides structure. Solution Uniqueness, Defense Conflict Index, User Preference, Smart mutation, guide the search using domain knowledge instead of relying on randomness. Modifying parameters often has well defined effect on metrics, increasing cost or lowering security, determined through experimentation (CHoPD). User Guidance is provided at every step of the algorithm. Users can understand how the search is progressing and influence it through an intuitive UI.

It should also be appreciated the disclosure teaches a method of communicating with a user interface by an operator to include: providing feedback on the direction of evolution used in a genetic algorithm search, allowing human input to better guide the search; influencing the search tradeoff between exploration, where the candidate generator can produce largely varying configurations to explore different areas of the search space, and exploitation, where smaller changes are made to a promising high-scoring candidate, to more thoroughly explore a small region of the configuration space; and requesting specific changes to include the use of a specific defense or a restriction on modifying a network resource, to be included in the next generation.

A number of embodiments of the disclosure have been described. Nevertheless, it will be understood that various modifications may be made without departing from the spirit and scope of the disclosure.

All publications and references cited herein are expressly incorporated herein by reference in their entirety.

Accordingly, other embodiments are within the scope of the following claims.

What is claimed is:

1. A method comprising:
   communicating with a user interface by an operator, the user interface framework including a web service engine that allows users to interact and provide feedback on direction of an evolution of cyber-security defenses;
   providing feedback, by the operator, on the convergence direction of evolution used in a genetic algorithm search, allowing human input to better guide the search;
   influencing, by the operator, the search tradeoff between exploration and exploitation to more efficiently explore a region of the configuration space; and
   requesting, by the operator, specific changes to include the use of a specific defense or a restriction on modifying a network resource to be included in a next generation of the genetic algorithm search;
   accessing quantitative results about the currently explored defense configurations to identify the configuration with the highest security given a certain upper limit for cost;
   accessing the best configurations found so far and determine whether the search is explorative or exploitative; and
   providing interactive views of the genetic algorithm search data to the operator that enable the users to impart information to guide the search by the genetic algorithm.

2. The method as recited in claim 1 further comprising providing analytic views of the genetic algorithm search data.

3. The method as recited in claim 1 wherein the interactive views enable the user to introduce new individuals to include in the genetic algorithm population.

4. The method as recited in claim 1 wherein the interactive views enable the user to introduce topology filters that can require or prohibit deployment of defenses in particular locations.

5. The method as recited in claim 2 wherein the analytic views display provenance or fitness over time data.

6. The method as recited in claim 1 wherein accessing quantitative results about the currently explored defense configurations provides information that enable the user to introduce topology filters that can required or prohibit deployment of defenses in particular locations.

7. The method as recited in claim 1 wherein accessing the best configurations found so far enable the user to guide the genetic algorithm search.

8. The method as recited in claim 1 wherein the interactive views enable the user to introduce topology filters that can require or prohibit deployment of defenses with particular parameter values.

9. The method as recited in claim 1 wherein accessing quantitative results about the currently explored defense configurations provides information that enable the user to introduce topology filters that can required or prohibit deployment of defenses with particular parameter values.

* * * * *